(12) United States Patent
Handelman

(10) Patent No.: US 8,873,963 B2
(45) Date of Patent: Oct. 28, 2014

(54) APPARATUS AND METHODS FOR GENERATING AND RECEIVING OPTICAL SIGNALS AT SUBSTANTIALLY 100GB/S AND BEYOND

(76) Inventor: Doron Handelman, Givatayim (IL)

( * ) Notice: Subject to any disclaimer, the term of this patent is extended or adjusted under 35 U.S.C. 154(b) by 71 days.

(21) Appl. No.: 13/558,166

(22) Filed: Jul. 25, 2012

(65) Prior Publication Data

US 2014/0029951 A1    Jan. 30, 2014

(51) Int. Cl.
| | | |
|---|---|---|
| H04J 14/02 | (2006.01) | |
| H04B 10/00 | (2013.01) | |
| H04B 10/04 | (2006.01) | |
| H04B 10/12 | (2006.01) | |
| H04B 10/06 | (2006.01) | |

(52) U.S. Cl.
USPC ............... 398/79; 398/91; 398/135; 398/182; 398/202

(58) Field of Classification Search
CPC ................................. H04J 14/02; H04B 10/40
USPC ...................... 398/79, 91, 135, 138
See application file for complete search history.

(56) References Cited

U.S. PATENT DOCUMENTS

| | | | |
|---|---|---|---|
| 5,459,799 A | 10/1995 | Weber | |
| 6,404,522 B1 | 6/2002 | Handelman | |
| 6,429,974 B1 * | 8/2002 | Thomas et al. | 359/618 |
| 6,574,018 B1 | 6/2003 | Handelman | |
| 6,678,476 B1 | 1/2004 | Hou | |
| 6,731,828 B2 | 5/2004 | Kitou et al. | |
| 6,763,191 B1 | 7/2004 | Handelman | |
| 6,768,841 B2 | 7/2004 | He | |
| 6,963,684 B2 | 11/2005 | Bhardwaj et al. | |
| 6,983,342 B2 | 1/2006 | Helenic et al. | |
| 7,099,587 B2 | 8/2006 | Handelman | |
| 7,106,967 B2 | 9/2006 | Handelman | |
| 7,161,964 B2 | 1/2007 | Lentine et al. | |
| 7,162,155 B2 | 1/2007 | Handelman | |

(Continued)

FOREIGN PATENT DOCUMENTS

EP    1126293 A2    8/2001

OTHER PUBLICATIONS

Spectral grids for WDM applications: DWDM frequency grid, Edition 2.0 of Recommendation ITU-T G.694.1, Feb. 2012, 16 pages, International Telecommunication Union (ITU).

(Continued)

*Primary Examiner* — David Payne
*Assistant Examiner* — Casey Kretzer
(74) *Attorney, Agent, or Firm* — Louis J. Hoffman

(57) ABSTRACT

A substantially 400 Gb/s optical transceiver includes a substantially 400 Gb/s optical transmitter which includes a set of four substantially 100 Gb/s tunable optical transmitters, each transmitting a substantially 100 Gb/s optical signal in a wavelength division multiplexed form over four channel wavelengths selected such that the resulting 16 channel wavelengths are different from each other and are suitable for WDM, and an optical transmission interface including a set of four 1:4 wavelength division demultiplexers which are operative to demultiplex the substantially 100 Gb/s optical signals to produce substantially 25 Gb/s optical signals over each of the 16 different channel wavelengths, and a 16:1 wavelength division multiplexer which is operative to multiplex the substantially 25 Gb/s optical signals of the 16 different channel wavelengths to generate a substantially 400 Gb/s optical signal. Other embodiments refer to a substantially 400 Gb/s optical receiver, other optical transceivers that operate at substantially 100 Gb/s and beyond, and related apparatus and methods.

11 Claims, 13 Drawing Sheets

(56) References Cited

U.S. PATENT DOCUMENTS

| | | | |
|---|---|---|---|
| 7,167,620 | B2 | 1/2007 | Handelman |
| 7,181,139 | B2 | 2/2007 | Handelman et al. |
| 7,317,873 | B2 | 1/2008 | Aoki |
| 7,409,121 | B2 | 8/2008 | Doerr et al. |
| 7,471,857 | B2 | 12/2008 | Kish, Jr. et al. |
| 7,570,844 | B2 | 8/2009 | Handelman |
| 7,827,589 | B2 | 11/2010 | Briggs |
| 7,898,991 | B2 | 3/2011 | Cole |
| 7,965,712 | B2 | 6/2011 | Handelman |
| 2002/0034197 | A1 | 3/2002 | Tornetta et al. |
| 2003/0039168 | A1 | 2/2003 | Chan et al. |
| 2003/0095783 | A1 | 5/2003 | Binder et al. |
| 2003/0156841 | A1 | 8/2003 | Chraplyvy et al. |
| 2003/0215243 | A1* | 11/2003 | Booth .......................... 398/135 |
| 2003/0223465 | A1 | 12/2003 | Blanchard |
| 2004/0028086 | A1 | 2/2004 | Ghiasi et al. |
| 2005/0089126 | A1 | 4/2005 | Zerbe et al. |
| 2005/0286643 | A1 | 12/2005 | Ozawa et al. |
| 2007/0071388 | A1* | 3/2007 | Lu ................................ 385/37 |
| 2007/0133995 | A1* | 6/2007 | Lee et al. ..................... 398/115 |
| 2008/0050118 | A1 | 2/2008 | Haran et al. |
| 2008/0205437 | A1 | 8/2008 | Cole |
| 2008/0285977 | A1* | 11/2008 | Caplan .......................... 398/130 |
| 2009/0022495 | A1* | 1/2009 | Welch et al. .................... 398/79 |
| 2009/0080584 | A1 | 3/2009 | Hamano et al. |
| 2009/0136229 | A1* | 5/2009 | Hoshida et al. .................. 398/1 |
| 2010/0046436 | A1 | 2/2010 | Doviak et al. |
| 2010/0247101 | A1 | 9/2010 | Pelusi |
| 2011/0135312 | A1 | 6/2011 | El-Ahmadi et al. |
| 2011/0293279 | A1* | 12/2011 | Lam et al. ....................... 398/79 |

OTHER PUBLICATIONS

Shen et al, Spectrum-Efficient and Agile CO-OFDM Optical Transport Networks: Architecture, Design, and Operation, IEEE Communications Magazine, May 2012, pp. 82-89, vol. 50, No. 5, The Institute of Electrical and Electronics Engineers, Inc., USA.

Jinno et al, Spectrum-Efficient and Scalable Elastic Optical Path Network: Architecture, Benefits, and Enabling Technologies, IEEE Communications Magazine, Nov. 2009, pp. 66-73, vol. 47, No. 11, The Institute of Electrical and Electronics Engineers, Inc., USA.

Sambo et al, Toward High-Rate and Flexible Optical Networks, IEEE Communications Magazine, May 2012, pp. 66-72, vol. 50, No. 5, The Institute of Electrical and Electronics Engineers, Inc., USA.

Vass, Optical communications trends for 2011, Lightwave, www.lightwaveonline.com, Jan. 12, 2011, 3 pages, PennWell Corporation.

Ferrant et al, Synchronous Ethernet: A Method to Transport Synchronization, IEEE Communications Magazine, Sep. 2008, pp. 126-134, vol. 46, No. 9, The Institute of Electrical and Electronics Engineers, Inc., USA.

Roberts et al, 100G and Beyond with Digital Coherent Signal Processing, IEEE Communications Magazine, Jul. 2010, pp. 62-69, vol. 48, No. 7, The Institute of Electrical and Electronics Engineers, Inc., USA.

McDonough, Moving Standards to 100 GbE and Beyond, IEEE Applications & Practice, Nov. 2007, pp. 6-9, vol. 45, Suppl. 3, The Institute of Electrical and Electronics Engineers, Inc., USA.

Benner et al., A Roadmap to 100G Ethernet at the Enterprise Data Center, IEEE Applications & Practice, Nov. 2007, pp. 10-17, vol. 45, Suppl. 3, The Institute of Electrical and Electronics Engineers, Inc., USA.

Cvijetic et al., Delivering on the 100GbE Promise, IEEE Applications & Practice, Dec. 2007, pp. 2-3, vol. 45, Suppl. 4, The Institute of Electrical and Electronics Engineers, Inc., USA.

Cole et al., 100GbE—Optical LAN Technologies, IEEE Applications & Practice, Dec. 2007, pp. 12-19, vol. 45, Suppl. 4, The Institute of Electrical and Electronics Engineers, Inc., USA.

Nicholl et al., A Physical Coding Sublayer for 100GbE, IEEE Applications & Practice, Dec. 2007, pp. 4-10, vol. 45, Suppl. 4, The Institute of Electrical and Electronics Engineers, Inc., USA.

Allen et al., Digital Optical Networks Using Photonic Integrated Circuits (PICs) Address the Challenges of Reconfigurable Optical Networks, IEEE Communications Magazine, Jan. 2008, pp. 35-43, vol. 46, No. 1, The Institute of Electrical and Electronics Engineers, Inc., USA.

Frazier, Aggregation at the Physical Layer, IEEE Communications Magazine, Feb. 2008, p. S12, vol. 46, No. 2, The Institute of Electrical and Electronics Engineers, Inc., USA.

Gustlin, An Introduction to CTBI, IEEE Communications Magazine, Feb. 2008, p. S13, vol. 46, No. 2, The Institute of Electrical and Electronics Engineers, Inc., USA.

Melle et al., Bandwidth Virtualization Enables Long-Haul WDM Transport of 40 Gb/s and 100 Gb/s Services, IEEE Communications Magazine, Feb. 2008, pp. S22-S29, vol. 46, No. 2, The Institute of Electrical and Electronics Engineers, Inc., USA.

Kang et al., Link Aggregation Member Interface Status Signal, Internet Draft draft-zi-pwe3-link-aggr-member-status-00.txt, Oct. 17, 2005, 17 pages, IETF.

D'Ambrosia, 100 Gigabit Ethernet and Beyond, IEEE Communications Magazine, Mar. 2010, pp. S6-S13, vol. 48, No. 3, The Institute of Electrical and Electronics Engineers, Inc., USA.

Wellbrock et al, the Road to 100G Deployment, IEEE Communications Magazine, Mar. 2010, pp. S14-S18, vol. 48, No. 3, The Institute of Electrical and Electronics Engineers, Inc., USA.

Roese et al, Optical Transport Network Evolving with 100 Gigabit Ethernet, IEEE Communications Magazine, Mar. 2010, pp. S28-S34, vol. 48, No. 3, The Institute of Electrical and Electronics Engineers, Inc., USA.

Anderson et al, Optical Transceivers for 100 Gigabit Ethernet and its Transport, IEEE Communications Magazine, Mar. 2010, pp. S35-S40, vol. 48, No. 3, The Institute of Electrical and Electronics Engineers, Inc., USA.

Toyoda et al, 100GbE PHY and MAC Layer Implementations, IEEE Communications Magazine, Mar. 2010, pp. S41-S47, vol. 48, No. 3, The Institute of Electrical and Electronics Engineers, Inc., USA.

Yu et al, Ultra-High-Capacity DWDM Transmission System for 100G and Beyond, IEEE Communications Magazine, Mar. 2010, pp. S56-S64, vol. 48, No. 3, The Institute of Electrical and Electronics Engineers, Inc., USA.

Miyamoto et al, Advanced Optical Modulation and Multiplexing Technologies for High-Capacity OTN Based on 100 Gb/s Channel and Beyond, IEEE Communications Magazine, Mar. 2010, pp. S65-S72, vol. 48, No. 3, The Institute of Electrical and Electronics Engineers, Inc., USA.

Winzer, Beyond 100G Ethernet, IEEE Communications Magazine, Jul. 2010, pp. 26-30, vol. 48, No. 7, The Institute of Electrical and Electronics Engineers, Inc., USA.

Gringeri et al, Flexible Architectures for Optical Transport Nodes and Networks, IEEE Communications Magazine, Jul. 2010, pp. 40-50, vol. 48, No. 7, The Institute of Electrical and Electronics Engineers, Inc., USA.

Gerstel et al, Elastic Optical Networking: A New Dawn for the Optical Layer?, IEEE Communications Magazine, Feb. 2012, pp. S12-S20, vol. 50, No. 2, The Institute of Electrical and Electronics Engineers, Inc., USA.

Gringeri et al, Technical Considerations for Supporting Data Rates Beyond 100 Gb/s, IEEE Communications Magazine, Feb. 2012, pp. S21-S30, vol. 50, No. 2, The Institute of Electrical and Electronics Engineers, Inc., USA.

Cole, Beyond 100G Client Optics, IEEE Communications Magazine, Feb. 2012, pp. S58-S66, vol. 50, No. 2, The Institute of Electrical and Electronics Engineers, Inc., USA.

Vlasov, Silicon CMOS-Integrated Nano-Photonics for Computer and Data Communications Beyond 100G, IEEE Communications Magazine, Feb. 2012, pp. S67-S72, vol. 50, No. 2, The Institute of Electrical and Electronics Engineers, Inc., USA.

Cole et al, Photonic Integration for High-Volume, Low-Cost Applications, IEEE Communications Magazine, Mar. 2009, pp. S16-S22, vol. 47, No. 3, The Institute of Electrical and Electronics Engineers, Inc., USA.

D'Ambrosia et al, CEI-28G: Paving the Way for 100 Gigabit, www.oiforum.com, Apr. 2, 2009, 8 pages, OIF—Optical Internetworking Forum, ethernet alliance.

(56) References Cited

OTHER PUBLICATIONS

Cole et al, CFP MSA Draft 1.0, Mar. 23, 2009, 52 pages, www.cfp-msa.org.

Hardy, Infinera lays out 40G1100G coherent roadmap, Lightwave Direct, www.lightwaveonline.com, May 20, 2010, 1 page, PennWell Corporation.

Hardy, 10×10 MSA releases 10-km, 40-km specs for 100-Gbps optical transceiver, Lightwave Direct, www.lightwaveonline.com, Aug. 2, 2011, 1 page, PennWell Corporation.

Hardy, Alcatel-Lucent makes 400-Gbps play, Lightwave Direct, www.lightwaveonline.com, Mar. 6, 2012, 2 pages, PennWell Corporation.

Fiber Fabry-Perot Tunable Filter FFP-TF2, Micron Optics, Inc FFP-TF2_0906.b_0906.1, 2010, 4 pages, www.micronoptics.com, Micron Optics, Inc., Georgia, USA.

Product Description—Optical Interleaver, www.optoplex.com/Optical_Interleaver.htm, downloaded Jul. 8, 2012, 2 pages, Optoplex Corporation, California, USA.

Product Specification: Interleaver (C-or L-Band, Bi-directional), R0.0; Nov. 20, 2008, 2 pages, www.optoplex.com, Optoplex Corporation, California, USA.

8-Channel Cyclic (Colorless) Arrayed Waveguide Grating (AWG), Feb. 2008, 2 pages, www.gemfire.com, Gemfire Corporation, California, USA.

Planar Waveguide Components Colorless MUX and DEMUX (APMUX2100CL), Dec. 8, 2003, 3 pages, www.andevices.com, ANDevices, Inc., California, USA.

CW-TOSA Integrable Tunable Laser Assemblies 5205-T/5206-T ITLA, Sep. 2011, 4 pages, www.jdsu.com, JDS Uniphase Corporation, California, USA.

LambdaFLEX (TM) iTLA TL5000VCJ Integrable Tunable Laser Assembly with variable output power, D00091-PB Issue Feb. 7, 2011, 7 pages, www.oclaro.com, Oclaro, Inc., California, USA.

Laser & ASE Systems, undated, catalog pp. 536, 537, 540 and 542, www.thorlabs.com, Thorlabs, Inc., New Jersey, USA.

Jamroz et al, Applied Microphotonics, 2006, p. 110, CRC Press, Taylor & Francis Group, USA.

Jinno et al, Multiflow Optical Transponder for Efficient Multilayer Optical Networking, IEEE Communications Magazine, May 2012, pp. 56-65, vol. 50, No. 5, The Institute of Electrical and Electronics Engineers, Inc., USA.

ZTE displays 400-Gbps and 1-Tbps DWDM prototype, Lightwave Direct, www.lightwaveonline.com, Jun. 18, 2012, 2 pages, PennWell Corporation.

Aoki et al, Next-Generation 100 Gb/s Undersea Optical Communications, IEEE Communications Magazine, Feb. 2012, pp. S50-S57, vol. 50, No. 2, The Institute of Electrical and Electronics Engineers, Inc., USA.

Semiconductor Optical Amplifier Application Catalog, undated, catalog pp. 4, 5, 10 and 11, www.alphion.com, Alphion Corporation, New Jersey, USA.

50 GHz Cyclic AWG MUX / DMUX, undated, 2 pages, VER1.0 / 050920, www.neophotonics.com, NeoPhotonics Corporation, California, USA.

Planar Waveguide Components Colorless AWG Multiplexers and Demultiplexers Module (APCYC), Jan. 12, 2005, 3 pages, www.andevices.com, ANDevices, Inc., California, USA.

* cited by examiner

APPARATUS AND METHODS FOR GENERATING AND RECEIVING OPTICAL SIGNALS AT SUBSTANTIALLY 100GB/S AND BEYOND

FIELD OF THE INVENTION

The present invention generally relates to optical communication, and more particularly to optical transmitters and optical receivers usable for optical communication, to methods of generating optical signals for transmission, to optical receiving methods, and to methods of operating optical transceivers.

BACKGROUND OF THE INVENTION

After 40 and 100 Gigabit Ethernet (GbE) and 100 Gigabit per second (Gb/s) optical transport network (OTN) have been standardized, it is expected that the next bit rate(s) per channel to be used beyond 100 Gb/s may be 400 Gb/s and/or 1000 Gb/s (1 Terabit per second). For example, considerations of 400 Gb/s and 1000 Gb/s for Ethernet and/or OTN and some possible architecture implementations for 400 Gb/s and/or 1000 Gb/s are discussed in the following references:

an article entitled "100 Gigabit Ethernet and Beyond", by John D'Ambrosia, in *IEEE Communications Magazine*, March 2010, pages S6-S13;

an article entitled "Optical Transport Network Evolving with 100 Gigabit Ethernet", by Josef Roese, Ralf-Peter Braun, Masahito Tomizawa and Osamu Ishida in *IEEE Communications Magazine*, March 2010, pages S28-S34;

an article entitled "Ultra-High-Capacity DWDM Transmission System for 100 G and Beyond", by Jianjun Yu and Xiang Zhou, in *IEEE Communications Magazine*, March 2010, pages S56-S64;

an article entitled "Beyond 100 G Ethernet", by Peter J. Winzer, in *IEEE Communications Magazine*, July 2010, pages 26-30;

an article entitled "Flexible Architectures for Optical Transport Nodes and Networks", by Steven Gringeri, Bert Basch, Vishnu Shukla, Roman Egorov, and Tiejun J. Xia, in *IEEE Communications Magazine*, July 2010, pages 40-50;

an article entitled "Elastic Optical Networking: A New Dawn for the Optical Layer?", by Ori Gerstel, Masahiko Jinno, Andrew Lord, and S. J. Ben Yoo, in *IEEE Communications Magazine*, February 2012, pages S12-S20;

an article entitled "Technical Considerations for Supporting Data Rates Beyond 100 Gb/s", by Steven Gringeri, E. Bert Basch, and Tiejun J. Xia, in *IEEE Communications Magazine*, February 2012, pages S21-S30;

an article entitled "Beyond 100 G Client Optics", by Chris Cole, in *IEEE Communications Magazine*, February 2012, pages S58-S66; and an article entitled "Silicon CMOS-Integrated Nano-Photonics for Computer and Data Communications Beyond 100 G", by Yurii A. Vlasov, in *IEEE Communications Magazine*, February 2012, pages S67-S72.

The following references are further believed to represent the state of the art:

an article entitled "Photonic Integration for High-Volume, Low-Cost Applications", by Chris Cole, Bernd Huebner, and John E. Johnson, in *IEEE Communications Magazine*, March 2009, pages S16-S22; and an article entitled "Multiflow Optical Transponder for Efficient Multilayer Optical Networking", by Masahiko Jinno, Hidehiko Takara, Yoshiaki Sone, Kazushige Yonenaha, and Akira Hirano, in *IEEE Communications Magazine*, May 2012, pages 56-65.

SUMMARY OF THE INVENTION

Certain embodiments of the present invention seek to provide improved optical transceivers for optical communication at bit rates of substantially 100 Gigabit per second (Gb/s) and beyond and methods of operating them, methods of generating optical signals for optical transmission at bit rates of substantially 100 Gb/s and beyond, and optical receiving methods for receiving optical signals at bit rates of substantially 100 Gb/s and beyond.

The term "transceiver" is used throughout the present specification and claims to refer to a combination of a transmitter and a receiver, and the term "optical transceiver" is used throughout the present specification and claims to refer to a combination of an optical transmitter and an optical receiver. Optical transceivers usable for optical communication at bit rates of substantially 100 Gb/s and beyond therefore include optical transmitters that transmit optical signals at bit rates of substantially 100 Gb/s and beyond and optical receivers that receive optical signals at bit rates of substantially 100 Gb/s and beyond.

Throughout the present specification and claims, the term "substantially", when used in conjunction with a specified bit-rate, refers to the specified bit rate or to approximately the specified bit rate. Thus, the term "substantially 10 Gb/s" refers to a bit rate of 10 Gb/s or approximately 10 Gb/s, the term "substantially 25 Gb/s" refers to a bit rate of 25 Gb/s or approximately 25 Gb/s, the term "substantially 100 Gb/s" refers to a bit rate of 100 Gb/s or approximately 100 Gb/s, the term "substantially 400 Gb/s" refers to a bit rate of 400 Gb/s or approximately 400 Gb/s, the term "substantially 1000 Gb/s" or "substantially 1 Tb/s" refers to a bit rate of 1000 Gb/s (1 Tb/s) or approximately 1 Tb/s, and so forth. For example, which is not meant to be limiting, the bit rate of substantially 25 Gb/s may be 25.78125 Gb/s and the bit rate of substantially 100 Gb/s may be four times the bit rate of substantially 25 Gb/s, in which case the bit rate of substantially 100 Gb/s is 103.125 Gb/s, which is greater than 100 Gb/s. Further for example, which is not meant to be limiting, the bit rate of substantially 400 Gb/s may be four times the bit rate of substantially 100 Gb/s, and in a case where the bit rate of substantially 100 Gb/s is greater than 100 Gb/s the bit rate of substantially 400 Gb/s is greater than 400 Gb/s.

There is thus provided in accordance with an embodiment of the present invention a substantially 400 Gb/s optical transceiver including a substantially 400 Gb/s optical transmitter including a set of four substantially 100 Gb/s tunable optical transmitters, each of the four substantially 100 Gb/s tunable optical transmitters transmitting a substantially 100 Gb/s optical signal in a wavelength division multiplexed form over four channel wavelengths selected such that the resulting 16 channel wavelengths are different from each other and are suitable for wavelength division multiplexing (WDM), and an optical transmission interface (OTRIN) including a set of four 1:4 wavelength division demultiplexers which are operative to demultiplex the substantially 100 Gb/s optical signals to produce substantially 25 Gb/s optical signals over each of the 16 different channel wavelengths, and a 16:1 wavelength division multiplexer which is operative to multiplex the substantially 25 Gb/s optical signals of the 16 different channel wavelengths to generate a substantially 400 Gb/s optical signal for transmission.

In some embodiments, the substantially 400 Gb/s optical transceiver further includes a substantially 400 Gb/s optical receiver including an optical receiving interface (ORCVIN) including a 1:16 wavelength division demultiplexer which is operative to demultiplex a received substantially 400 Gb/s optical signal to produce substantially 25 Gb/s optical signals over 16 different channel wavelengths, and a set of four 4:1 wavelength division multiplexers, each of the four 4:1 wavelength division multiplexers being operative to multiplex substantially 25 Gb/s optical signals of four different channel wavelengths of the 16 different channel wavelengths using WDM to generate a substantially 100 Gb/s optical signal, and a set of four substantially 100 Gb/s colorless or tunable (C/T) optical receivers which are operative to receive the resulting four substantially 100 Gb/s optical signals.

There is also provided in accordance with a further embodiment of the present invention a method of generating a substantially 400 Gb/s optical signal for transmission, the method including receiving four substantially 100 Gb/s optical signals from four substantially 100 Gb/s tunable optical transmitters, each substantially 100 Gb/s tunable optical transmitter transmitting a respective one of the substantially 100 Gb/s optical signals in a wavelength division multiplexed form over four channel wavelengths selected such that the resulting 16 channel wavelengths are different from each other and are suitable for WDM, demultiplexing the received substantially 100 Gb/s optical signals to produce substantially 25 Gb/s optical signals over each of the 16 different channel wavelengths, and multiplexing the substantially 25 Gb/s optical signals of the 16 different channel wavelengths to generate a substantially 400 Gb/s optical signal.

There is also provided in accordance with yet a further embodiment of the present invention a method of receiving a substantially 400 Gb/s optical signal, the method including demultiplexing the substantially 400 Gb/s optical signal to produce substantially 25 Gb/s optical signals over 16 different channel wavelengths, multiplexing the substantially 25 Gb/s optical signals of the 16 different channel wavelengths as four groups of substantially 25 Gb/s optical signals of 4 different channel wavelengths using WDM to produce four substantially 100 Gb/s optical signals, and receiving the resulting four substantially 100 Gb/s optical signals.

There is also provided in accordance with still a further embodiment of the present invention a substantially 1 Tb/s optical transceiver including a substantially 1 Tb/s optical transmitter including a set of ten substantially 100 Gb/s tunable optical transmitters, each of the ten substantially 100 Gb/s tunable optical transmitters transmitting a substantially 100 Gb/s optical signal in a wavelength division multiplexed form over four channel wavelengths selected such that the resulting 40 channel wavelengths are different from each other and are suitable for WDM, and an OTRIN including a set of ten 1:4 wavelength division demultiplexers which are operative to demultiplex the substantially 100 Gb/s optical signals to produce substantially 25 Gb/s optical signals over each of the 40 different channel wavelengths, and a 40:1 wavelength division multiplexer which is operative to multiplex the substantially 25 Gb/s optical signals of the 40 different channel wavelengths to generate a substantially 1 Tb/s optical signal for transmission.

In some embodiments, the substantially 1 Tb/s optical transceiver further includes a substantially 1 Tb/s optical receiver including an ORCVIN including a 1:40 wavelength division demultiplexer which is operative to demultiplex a received substantially 1 Tb/s optical signal to produce substantially 25 Gb/s optical signals over 40 different channel wavelengths, and a set of ten 4:1 wavelength division multiplexers, each of the ten 4:1 wavelength division multiplexers being operative to multiplex substantially 25 Gb/s optical signals of four different channel wavelengths of the 40 different channel wavelengths using WDM to generate a substantially 100 Gb/s optical signal, and a set of ten substantially 100 Gb/s C/T optical receivers which are operative to receive the resulting ten substantially 100 Gb/s optical signals.

There is also provided in accordance with yet a further embodiment of the present invention a method of generating a substantially 1 Tb/s optical signal for transmission, the method including receiving ten substantially 100 Gb/s optical signals from ten substantially 100 Gb/s tunable optical transmitters, each substantially 100 Gb/s tunable optical transmitter transmitting a respective one of the substantially 100 Gb/s optical signals in a wavelength division multiplexed form over four channel wavelengths selected such that the resulting 40 channel wavelengths are different from each other and are suitable for WDM, demultiplexing the received substantially 100 Gb/s optical signals to produce substantially 25 Gb/s optical signals over each of the 40 different channel wavelengths, and multiplexing the substantially 25 Gb/s optical signals of the 40 different channel wavelengths to generate a substantially 1 Tb/s optical signal.

There is also provided in accordance with still a further embodiment of the present invention a method of receiving a substantially 1 Tb/s optical signal, the method including demultiplexing the substantially 1 Tb/s optical signal to produce substantially 25 Gb/s optical signals over 40 different channel wavelengths, multiplexing the substantially 25 Gb/s optical signals of the 40 different channel wavelengths as ten groups of substantially 25 Gb/s optical signals of 4 different channel wavelengths using WDM to produce ten substantially 100 Gb/s optical signals, and receiving the resulting ten substantially 100 Gb/s optical signals.

There is also provided in accordance with yet a further embodiment of the present invention a method of operating a substantially 100 Gb/s tunable optical transceiver, the method including operating the substantially 100 Gb/s tunable optical transceiver in a first mode at center wavelengths as defined for 100 Gigabit Ethernet (100 GbE) for stand-alone communication at substantially 100 Gb/s, and operating the substantially 100 Gb/s tunable optical transceiver in a second mode at wavelengths which are different from wavelengths used by at least one additional substantially 100 Gb/s optical transceiver and which are suitable for WDM therewith for communication together with the at least one additional substantially 100 Gb/s optical transceiver in a wavelength division multiplexed form at a bit rate greater than or equal to substantially 200 Gb/s.

There is also provided in accordance with still a further embodiment of the present invention a substantially 100 Gb/s tunable optical transceiver including a substantially 100 Gb/s tunable optical transmitter including a transmitter electrical interface (TREI), and a transmitter electro-optical interface (TREO) operatively associated with the TREI and including four tunable laser sources (TLs) and a 4:1 colorless wavelength division multiplexer, a substantially 100 Gb/s colorless or tunable optical receiver including a receiver electrical interface (RXEI), and a receiver electro-optical interface (RXEO) operatively associated with the RXEI and including a 1:4 colorless or tunable wavelength division demultiplexer, and a micro-controller operative to control the TREO for tuning the four TLs and to control the RXEO when the demultiplexer is a 1:4 tunable wavelength division demultiplexer for tuning the demultiplexer so as to enable operation of the substantially 100 Gb/s tunable optical transceiver in a first mode at center wavelengths as defined for 100 GbE for standalone communication at substantially 100 Gb/s and in a second mode at wavelengths which are different from wavelengths used by at least one additional substantially 100 Gb/s optical transceiver and which are suitable for WDM therewith for communication together with the at least one additional substantially 100 Gb/s optical transceiver in a wavelength division multiplexed form at a bit rate greater than or equal to substantially 200 Gb/s.

There is also provided in accordance with another embodiment of the present invention a substantially 400 Gb/s optical transceiver including a substantially 400 Gb/s optical transmitter including a set of four substantially 100 Gb/s tunable optical transmitters tunable to sets of wavelengths that are usable for interleaving and operative to transmit substantially 100 Gb/s optical signals, and an optical interleaving unit (OIU) operatively associated with the four substantially 100 Gb/s tunable optical transmitters and operative to interleave the substantially 100 Gb/s optical signals from the four substantially 100 Gb/s tunable optical transmitters to generate a substantially 400 Gb/s optical signal for transmission.

In some embodiments, the substantially 400 Gb/s optical transceiver further includes a substantially 400 Gb/s optical receiver including an optical de-interleaving unit (ODeIU) which is operative to de-interleave a received substantially 400 Gb/s optical signal to produce four substantially 100 Gb/s de-interleaved optical signals, and a set of four substantially 100 Gb/s C/T optical receivers operatively associated with the ODeIU and operative to receive the four substantially 100 Gb/s de-interleaved optical signals.

There is also provided in accordance with another embodiment of the present invention a method of generating a substantially 400 Gb/s optical signal for transmission, the method including receiving substantially 100 Gb/s optical signals from four substantially 100 Gb/s tunable optical transmitters over wavelengths which are different from each other and are usable for interleaving, and interleaving the substantially 100 Gb/s optical signals to generate the substantially 400 Gb/s optical signal.

There is also provided in accordance with yet another embodiment of the present invention a method of receiving a substantially 400 Gb/s optical signal, the method including de-interleaving the substantially 400 Gb/s optical signal to produce four substantially 100 Gb/s de-interleaved optical signals, and receiving the four substantially 100 Gb/s de-interleaved optical signals.

There is also provided in accordance with a further embodiment of the present invention a substantially 800 Gb/s optical transceiver including two substantially 400 Gb/s optical transceivers, each including a substantially 400 Gb/s optical transmitter and a substantially 400 Gb/s optical receiver, an optical interleaver operatively associated with the two substantially 400 Gb/s optical transmitters of the two substantially 400 Gb/s optical transceivers and operative to interleave substantially 400 Gb/s optical signals from the two substantially 400 Gb/s optical transmitters to generate a substantially 800 Gb/s optical signal for transmission, and an optical de-interleaver operatively associated with the two substantially 400 Gb/s optical receivers of the two substantially 400 Gb/s optical transceivers and operative to de-interleave a received substantially 800 Gb/s optical signal to produce two substantially 400 Gb/s de-interleaved optical signals for reception by the two substantially 400 Gb/s optical receivers.

There is also provided in accordance with yet a further embodiment of the present invention a substantially 1600 Gb/s optical transceiver including two substantially 800 Gb/s optical transceivers, each including a substantially 800 Gb/s optical transmitter and a substantially 800 Gb/s optical receiver, an optical interleaver operatively associated with the two substantially 800 Gb/s optical transmitters of the two substantially 800 Gb/s optical transceivers and operative to interleave substantially 800 Gb/s optical signals from the two substantially 800 Gb/s optical transmitters to generate a substantially 1600 Gb/s optical signal for transmission, and an optical de-interleaver operatively associated with the two substantially 800 Gb/s optical receivers of the two substantially 800 Gb/s optical transceivers and operative to de-interleave a received substantially 1600 Gb/s optical signal to produce two substantially 800 Gb/s de-interleaved optical signals for reception by the two substantially 800 Gb/s optical receivers.

There is also provided in accordance with still a further embodiment of the present invention a method of generating a substantially 800 Gb/s optical signal for transmission, the method including receiving substantially 400 Gb/s optical signals from two substantially 400 Gb/s optical transmitters, each of the substantially 400 Gb/s optical signals being in a wavelength division multiplexed form over wavelengths which are usable for interleaving, and interleaving the substantially 400 Gb/s optical signals to generate a substantially 800 Gb/s optical signal.

There is also provided in accordance with yet a further embodiment of the present invention a method of receiving a substantially 800 Gb/s optical signal, the method including de-interleaving the substantially 800 Gb/s optical signal to produce two substantially 400 Gb/s de-interleaved optical signals, and receiving the two substantially 400 Gb/s de-interleaved optical signals.

There is also provided in accordance with still a further embodiment of the present invention a method of generating a substantially 1600 Gb/s optical signal for transmission, the method including receiving substantially 800 Gb/s optical signals from two substantially 800 Gb/s optical transmitters, each of the substantially 800 Gb/s optical signals being in a wavelength division multiplexed form over wavelengths which are usable for interleaving, and interleaving the substantially 800 Gb/s optical signals to generate a substantially 1600 Gb/s optical signal.

There is also provided in accordance with yet a further embodiment of the present invention a method of receiving a substantially 1600 Gb/s optical signal, the method including de-interleaving the substantially 1600 Gb/s optical signal to produce two substantially 800 Gb/s de-interleaved optical signals, and receiving the two substantially 800 Gb/s de-interleaved optical signals.

BRIEF DESCRIPTION OF THE DRAWINGS

The present invention will be understood and appreciated more fully from the following detailed description, taken in conjunction with the drawings in which.

DETAILED DESCRIPTION OF EMBODIMENTS

Figure 1:
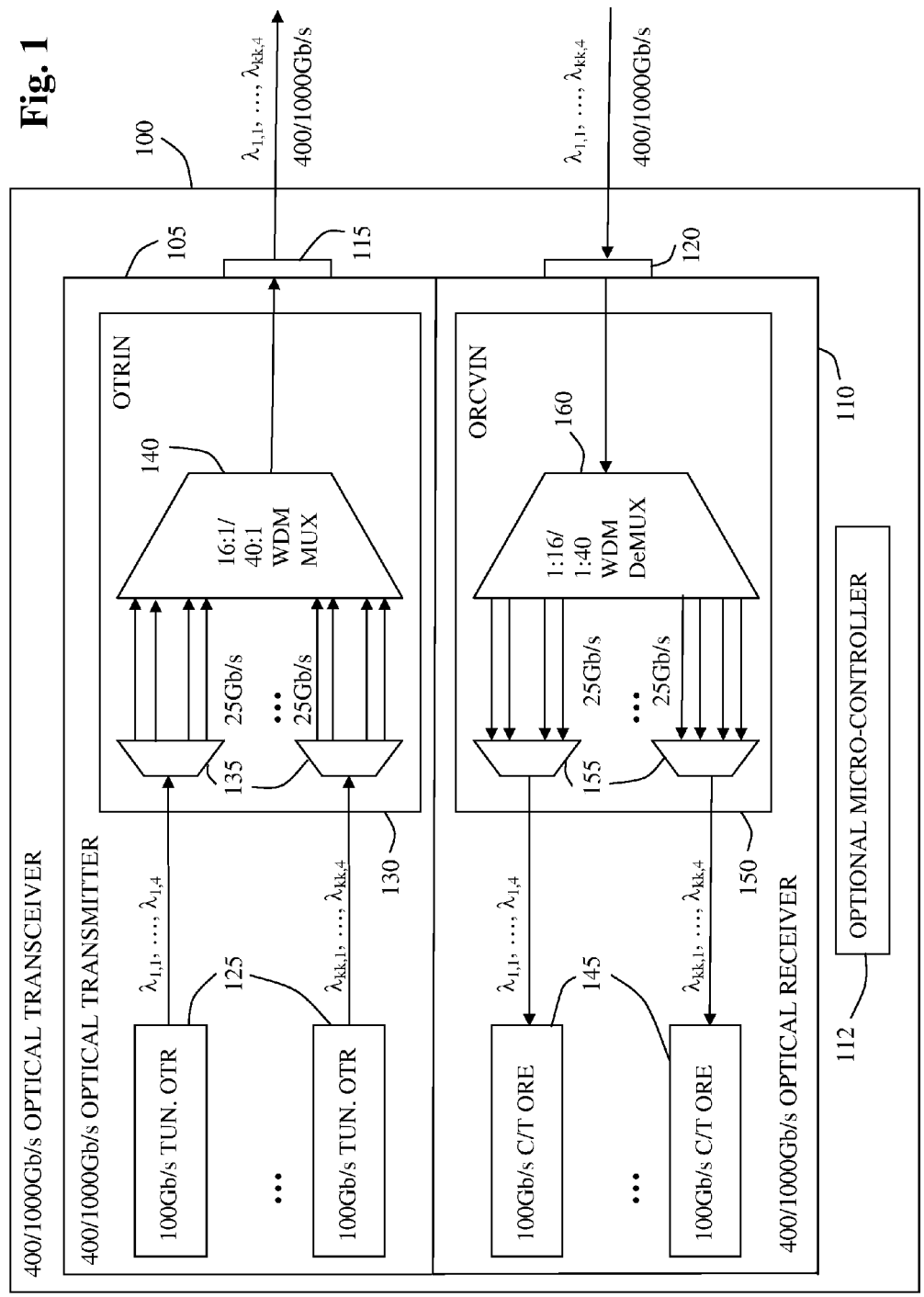
FIG. 1 is a simplified block diagram illustration of a substantially 400 Gb/s or 1000 Gb/s (400/1000 Gb/s) optical transceiver constructed and operative in accordance with an embodiment of the present invention.

Reference is now made to FIG. 1, which is a simplified block diagram illustration of a substantially 400 Gb/s or 1000 Gb/s (400/1000 Gb/s) optical transceiver constructed and operative in accordance with an embodiment of the present invention.

The substantially 400/1000 Gb/s (Gb/s—Gigabit per second, 1000 Gb/s=1 terabit per second (Tb/s)) optical transceiver of FIG. 1, which is generally designated 100, includes a substantially 400/1000 Gb/s optical transmitter 105, a substantially 400/1000 Gb/s optical receiver 110, and optionally a micro-controller 112 or any other appropriate controller. The optical transmitter 105 is operative to transmit substantially 400/1000 Gb/s optical signals and the optical receiver 110 is operative to receive substantially 400/1000 Gb/s optical signals. The controller 112, if included, may control channel wavelength tuning in the optical transmitter 105 and the optical receiver 110 by controlling components associated with the optical transmitter 105 and the optical receiver 110, respectively, as described herein below, and may also be operative to identify and report faults, such as thermal deviation faults, and may perform transceiver control and management operations, such as operations related to thermal control and management.

The terms "channel wavelength" and "wavelength" are used interchangeably throughout the present specification and claims and refer to an optical channel around a center wavelength.

The optical transmitter 105 may transmit the substantially 400/1000 Gb/s optical signals via a port 115 which is comprised in or associated with the optical transceiver 100, and the optical receiver 110 may receive the substantially 400/1000 Gb/s optical signals via a port 120 which is comprised in or associated with the optical transceiver 100. Each of the ports 115 and 120 may typically be associated with an optical fiber (not shown) over which the substantially 400/1000 Gb/s optical signals are transmitted and received, respectively.

The optical transmitter 105 includes a set of substantially 100 Gb/s tunable optical transmitters 125 and an optical transmission interface (OTRIN) 130. The OTRIN 130 includes a set of 1:4 wavelength division demultiplexers 135 and a wavelength division multiplexer 140. Each of the tunable optical transmitters 125 is operatively associated with a corresponding separate one of the 1:4 wavelength division demultiplexers 135, and the wavelength division multiplexer 140 is operatively associated with all of the 1:4 wavelength division demultiplexers 135.

Typically, four tunable optical transmitters 125 form the set of substantially 100 Gb/s tunable optical transmitters 125 and four 1:4 wavelength division demultiplexers 135 form the set of 1:4 wavelength division demultiplexers 135 of the OTRIN 130 in a case where the optical transmitter 105 is a substantially 400 Gb/s optical transmitter which transmits substantially 400 Gb/s optical signals, and ten tunable optical transmitters 125 form the set of substantially 100 Gb/s tunable optical transmitters 125 and ten 1:4 wavelength division demultiplexers 135 form the set of 1:4 wavelength division demultiplexers 135 of the OTRIN 130 in a case where the optical transmitter 105 is a substantially 1000 Gb/s optical transmitter which transmits substantially 1000 Gb/s (1 Tb/s) optical signals. Each of the substantially 100 Gb/s tunable optical transmitters 125 transmits optical signals in a wavelength division multiplexed form over four channel wavelengths selected such that the resulting channel wavelengths of all of the substantially 100 Gb/s tunable optical transmitters 125 are different from each other and are suitable for wavelength division multiplexing (WDM).

The term "wavelength division multiplexing" (WDM) is used throughout the present specification and claims to refer to Dense Wavelength Division Multiplexing (DWDM) as well as to Ultra DWDM (UDWDM) of optical signals carried over two or more (channel) wavelengths. The terms "wavelength division multiplexer" and "wavelength division demultiplexer" are used throughout the present specification and claims to refer to a multiplexer (MUX) and a demultiplexer (DeMUX) that perform wavelength division multiplexing and demultiplexing, respectively.

The wavelength division multiplexer 140 includes a 16:1 wavelength division multiplexer in the case where the optical transmitter 105 is a substantially 400 Gb/s optical transmitter, and a 40:1 wavelength division multiplexer in the case where the optical transmitter 105 is a substantially 1000 Gb/s optical transmitter.

The 1:4 wavelength division demultiplexers 135 are operative to demultiplex substantially 100 Gb/s optical signals from the tunable optical transmitters 125 to produce substantially 25 Gb/s optical signals over each of the different channel wavelengths. Therefore, substantially 25 Gb/s optical signals over each of 16 different channel wavelengths are produced in the case where the optical transmitter 105 is a substantially 400 Gb/s optical transmitter, and substantially 25 Gb/s optical signals over each of 40 different channel wavelengths are produced in the case where the optical transmitter 105 is a substantially 1000 Gb/s optical transmitter.

The wavelength division multiplexer 140 is operative to multiplex the substantially 25 Gb/s optical signals of the different channel wavelengths. In the case where the optical transmitter 105 is a substantially 400 Gb/s optical transmitter, the wavelength division multiplexer 140 multiplexes the substantially 25 Gb/s optical signals of the 16 different channel wavelengths to generate a substantially 400 Gb/s optical signal for transmission, via the port 115, over the optical fiber with which the port 115 is associated. In the case where the optical transmitter 105 is a substantially 1000 Gb/s optical transmitter, the wavelength division multiplexer 140 multiplexes the substantially 25 Gb/s optical signals of the 40 different channel wavelengths to generate a substantially 1000 Gb/s optical signal for transmission, via the port 115, over the optical fiber with which the port 115 is associated.

The substantially 400/1000 Gb/s optical receiver 110 includes a set of substantially 100 Gb/s colorless or tunable (C/T) optical receivers 145, and an optical receiving interface (ORCVIN) 150. The ORCVIN 150 includes a set of 4:1 wavelength division multiplexers 155 and a wavelength division demultiplexer 160. Each of the C/T optical receivers 145 is operatively associated with a corresponding separate one of the 4:1 wavelength division multiplexers 155, and the wavelength division demultiplexer 160 is operatively associated with all of the 4:1 wavelength division multiplexers 155.

The term "colorless" is used throughout the present specification and claims in connection with a device, such as an optical receiver or an arrayed waveguide grating (AWG) or other type of wavelength division multiplexer or demultiplexer or a component or portion of a wavelength division multiplexer or demultiplexer, to indicate that the device is not limited to use in a single wavelength (color) band or sub-band and can rather be adequately used in any of a plurality of desired color bands or sub-bands.

Typically, four optical receivers 145 form the set of substantially 100 Gb/s C/T optical receivers 145 and four 4:1 wavelength division multiplexers 155 form the set of 4:1 wavelength division multiplexers 155 of the ORCVIN 150 in a case where the optical receiver 110 is a substantially 400 Gb/s optical receiver which receives substantially 400 Gb/s optical signals, and ten optical receivers 145 form the set of substantially 100 Gb/s C/T optical receivers 145 and ten 4:1 wavelength division multiplexers 155 form the set of 4:1 wavelength division multiplexers 155 of the ORCVIN 150 in a case where the optical receiver 110 is a substantially 1000 Gb/s optical receiver which receives substantially 1 Tb/s optical signals.

The wavelength division demultiplexer 160 includes a 1:16 wavelength division demultiplexer in the case where the optical receiver 110 is a substantially 400 Gb/s optical receiver, and a 1:40 wavelength division demultiplexer in the case where the optical receiver 110 is a substantially 1000 Gb/s optical receiver.

In the case where the optical receiver 110 is a substantially 400 Gb/s optical receiver, the wavelength division demultiplexer 160 demultiplexes a substantially 400 Gb/s optical signal received over the optical fiber with which the port 120 is associated to produce substantially 25 Gb/s optical signals over 16 different channel wavelengths. Each of the four 4:1 wavelength division multiplexers 155 receives substantially 25 Gb/s optical signals over a separate set of four channel wavelengths of the 16 different channel wavelengths, where each 4:1 wavelength division multiplexer 155 is operable at the four channel wavelengths of the substantially 25 Gb/s optical signals received thereat.

Each of the four 4:1 wavelength division multiplexers 155 multiplexes, using WDM, the substantially 25 Gb/s optical signals received thereat over the respective separate set of four channel wavelengths to generate a substantially 100 Gb/s optical signal. The resulting four substantially 100 Gb/s optical signals are provided to the four optical receivers 145 for reception thereby.

In the case where the optical receiver 110 is a substantially 1000 Gb/s optical receiver, the wavelength division demultiplexer 160 demultiplexes a substantially 1000 Gb/s optical signal received over the optical fiber with which the port 120 is associated to produce substantially 25 Gb/s optical signals over 40 different channel wavelengths. Each of the ten 4:1 wavelength division multiplexers 155 receives substantially 25 Gb/s optical signals over a separate set of four channel wavelengths of the 40 different channel wavelengths, where each 4:1 wavelength division multiplexer 155 is operable at the four channel wavelengths of the substantially 25 Gb/s optical signals received thereat.

Each of the ten 4:1 wavelength division multiplexers 155 multiplexes, using WDM, the substantially 25 Gb/s optical signals received thereat over the respective separate set of four channel wavelengths to generate a substantially 100 Gb/s optical signal. The resulting ten substantially 100 Gb/s optical signals are provided to the ten optical receivers 145 for reception thereby.

The channel wavelengths used by the substantially 100 Gb/s C/T optical receivers 145 typically correspond to the different channel wavelengths used by the substantially 100 Gb/s tunable optical transmitters 125. The different channel wavelengths used by all of the substantially 100 Gb/s tunable optical transmitters 125, as well as by all of the substantially 100 Gb/s C/T optical receivers 145, form a group of kk sets of four different channel wavelengths in which the channel wavelengths are designated by their center wavelengths (λs) as follows: $\lambda_{1,1}, \lambda_{1,2}, \lambda_{1,3}, \lambda_{1,4}, \ldots, \lambda_{kk,1}, \lambda_{kk,2}, \lambda_{kk,3}$, and $\lambda_{kk,4}$, where kk is a positive integer such that kk=4 in the case where the optical transceiver 100 is a substantially 400 Gb/s optical transceiver, and kk=10 in the case where the optical transceiver 100 is a substantially 1 Tb/s optical transceiver. The different channel wavelengths $\lambda_{1,1}, \lambda_{1,2}, \lambda_{1,3}, \lambda_{1,4}, \ldots, \lambda_{kk,1}, \lambda_{kk,2}, \lambda_{kk,3}$, and $\lambda_{kk,4}$ may, for example, be appropriate channel wavelengths in any of the International Telecommunication Union (ITU) specified O, S, C, and L transmission bands.

The substantially 100 Gb/s tunable optical transmitters 125 may include, for example, optical transmitters as described herein below with reference to FIG. 2 and/or FIG. 3, and the substantially 100 Gb/s C/T optical receivers 145 may include, for example, optical receivers as described herein below with reference to FIG. 2 and/or FIG. 3.

In one embodiment, the 4:1 wavelength division multiplexers 155 and the 1:4 wavelength division demultiplexers 135 may be similar in structure and operative to either multiplex or demultiplex, depending on transmission or reception application. For example, which is not meant to be limiting, in a case where the different channel wavelengths are channel wavelengths in the C or L bands each 4:1 wavelength division multiplexer 155 and each 1:4 wavelength division demultiplexer 135 may be implemented by an AWG multiplexer/demultiplexer (MUX/DeMUX).

The AWGs of all 1:4 wavelength division demultiplexers 135 may, for example, be similar and may, for example, include conventional colorless AWGs that can accommodate the entire group of kk sets of four different channel wavelengths using AWG repeat orders so that the same type of colorless AWG may be used for each set of four different channel wavelengths in the group of kk sets of four different channel wavelengths. The AWGs of the 4:1 wavelength division multiplexers 155 may, for example, be similar to the AWGs of the 1:4 wavelength division demultiplexers 135.

By way of a non-limiting example, conventional colorless AWGs that can accommodate 40 or more channel wavelengths may be appropriate for implementing the demultiplexers 135 and the multiplexers 155 both in the case where the optical transceiver 100 is a substantially 400 Gb/s optical transceiver using 16 different channel wavelengths and in the case where the optical transceiver 100 is a substantially 1000 Gb/s optical transceiver using 40 different channel wavelengths. Non-limiting examples of such conventional colorless AWGs include the 8-Channel Cyclic (Colorless) Arrayed Waveguide Grating (AWG) of Gemfire Corporation of Fremont, Calif., USA, the Colorless MUX and DEMUX (APMUX2100CL) and the Colorless AWG Multiplexers and Demultiplexers Module (APCYC) of ANDevices, Inc. of Fremont, Calif., USA, and the 50 GHz Cyclic AWG MUX/DMUX of Neophotonics Corporation of San Jose, Calif., USA.

In another embodiment, each 4:1 wavelength division multiplexer 155 and each 1:4 wavelength division demultiplexer 135 may be implemented, for example, by a conventional 4×1 coupler/1×4 decoupler or other passive 4×1 combiner/1×4 splitter which combines or splits optical signals inputted thereto and is typically colorless, with each 1:4 wavelength division demultiplexer 135 further including four wavelength-selective devices (WSDs) respectively coupled to four output ports or branches of the decoupler or splitter. The WSDs selectively pass optical signals at desired channel wavelengths and substantially attenuate or block optical signals at undesired channel wavelengths.

The WSDs of the demultiplexers 135 may be fixed or tunable. In the case where the WSDs of the demultiplexers 135 are fixed, each of the WSDs of the demultiplexers 135 may, by way of a non-limiting example, include an interference filter with a fixed passband around a respective one of the different channel wavelengths $\lambda_{1,1}, \lambda_{1,2}, \lambda_{1,3}, \lambda_{1,4}, \ldots, \lambda_{kk,1}, \lambda_{kk,2}, \lambda_{kk,3}$, and $\lambda_{kk,4}$ so that each such WSD passes optical signals carried over the respective one of the different channel wavelengths $\lambda_{1,1}, \lambda_{1,2}, \lambda_{1,3}, \lambda_{1,4}, \ldots, \lambda_{kk,1}, \lambda_{kk,2}, \lambda_{kk,3}$, and $\lambda_{kk,4}$ and substantially attenuates or blocks optical signals carried over the other ones of the channel wavelengths $\lambda_{1,1}, \lambda_{1,2}, \lambda_{1,3}, \lambda_{1,4}, \ldots, \lambda_{kk,1}, \lambda_{kk,2}, \lambda_{kk,3}$, and $\lambda_{kk,4}$.

In the case where the WSDs of the demultiplexers 135 are tunable, each WSD of the demultiplexers 135 may include a tunable optical filter that is tunable across a desired one of the ITU specified O, S, C and L transmission bands, or a combination thereof, or a portion of one of the O, S, C and L transmission bands. The tunable optical filter may, for example, include a conventional tunable optical filter, such as the Fiber Fabry-Perot Tunable Filter FFP-TF2, which is commercially available from Micron Optics, Inc. of Atlanta, Ga., USA and has configurations enabling tuning across any one of the O, E, S, C and L bands separately, or across a combination of the C and L bands. In one embodiment, tuning of the WSDs of the demultiplexers 135 may be controlled by controllers (not shown in FIG. 1) that are associated with the transmitters 125 and the receivers 145. In another embodiment, tuning of the WSDs of the demultiplexers 135 may be controlled by the controller 112. In yet another embodiment, tuning of the WSDs of the demultiplexers 135 may be controlled by the controller 112 operating in conjunction with the controllers that are associated with the transmitters 125 and the receivers 145.

The 1:4 wavelength division demultiplexers 135 may therefore be fixed or tunable depending on whether the WSDs of the demultiplexers 135 are fixed or tunable in the implementation of the demultiplexers 135 by decouplers or splitters together with WSDs, or colorless when implemented by a colorless AWG MUX/DeMUX. The 4:1 wavelength division multiplexers 155 are typically colorless MUXes when implemented by colorless AWGs and also when implemented by couplers or combiners because each coupler or combiner is typically colorless. It is however appreciated that the 4:1 wavelength division multiplexers 155 are not limited to colorless MUXes, and may alternatively include fixed or tunable MUXes, such as fixed or tunable MUXes based on couplers or combiners coupled to WSDs as in the implementation of the demultiplexers 135 by decouplers or splitters together with WSDs.

In one embodiment, the wavelength division multiplexer 140 and the wavelength division demultiplexer 160 may be similar in structure and operative to either multiplex or demultiplex, depending on transmission or reception application. For example, which is not meant to be limiting, each of the wavelength division multiplexer 140 and the wavelength division demultiplexer 160 may be implemented, for example, by a conventional N2×1 coupler/1×N2 decoupler (N2 designates the number of ports or branches) or other passive N2×1 combiner/1×N2 splitter which combines or splits optical signals inputted thereto and is typically colorless, with the wavelength division demultiplexer 160 further including N2 WSDs respectively coupled to N2 output ports or branches of the decoupler or splitter, where N2=16 in the case where the optical transceiver 100 is a substantially 400 Gb/s optical transceiver and N2=40 in the case where the optical transceiver 100 is a substantially 1000 Gb/s optical transceiver. The WSDs of the demultiplexer 160 selectively pass optical signals at desired channel wavelengths and substantially attenuate or block optical signals at undesired channel wavelengths.

Similarly to the WSDs of the DeMUXes 135, the WSDs of the DeMUX 160 may be fixed or tunable. In the case where the WSDs of the DeMUX 160 are fixed, the WSDs of the DeMUX 160 may include interference filters that are similar to the interference filters that may be used for the DeMUXes 135, and in the case where the WSDs of the DeMUX 160 are tunable, the WSDs of the DeMUX 160 may include tunable optical filters that are similar to the tunable optical filters that may be used for the DeMUXes 135. Further in the case where the WSDs of the DeMUX 160 are tunable, tuning of the WSDs of the DeMUX 160 may be controlled in one embodiment by the controllers that are associated with the transmitters 125 and the receivers 145, or in another embodiment by the controller 112, or in yet another embodiment by the controller 112 operating in conjunction with the controllers that are associated with the transmitters 125 and the receivers 145.

The DeMUX 160 may therefore be a fixed or tunable DeMUX depending on whether the WSDs of the DeMUX 160 are fixed or tunable, and the MUX 140 is typically a colorless MUX because the N2×1 coupler or combiner is typically colorless. It is however appreciated that the DeMUX 160 is not limited to a fixed or tunable DeMUX, and may alternatively include a colorless DeMUX, such as a colorless DeMUX based on one or more colorless AWGs. Furthermore, the MUX 140 is not limited to a colorless MUX, and may alternatively include a fixed or tunable MUX, such as a fixed or tunable MUX based on a coupler or combiner coupled to WSDs as in the implementation of the DeMUX 160 by a decoupler or splitter together with WSDs.

In transmission operation, each substantially 100 Gb/s tunable optical transmitter 125 is tuned so as to use a selected set of four channel wavelengths which are different from channel wavelengths used by another substantially 100 Gb/s tunable optical transmitter 125, and so that all the selected different channel wavelengths of the sets of four different channel wavelengths are suitable for WDM and also usable by the 1:4 wavelength division demultiplexers 135, the 4:1 wavelength division multiplexers 155, the wavelength division multiplexer 140, and the wavelength division demultiplexer 160. Tuning of the substantially 100 Gb/s tunable optical transmitters 125 to the sets of four different channel wavelengths may be automatically performed in response to instructions provided by the controllers associated with the transmitters 125 and the receivers 145, or by the controller 112, or by the controller 112 operating in conjunction with the controllers associated with the transmitters 125 and the receivers 145.

In 100 Gigabit Ethernet (100 GbE) physical layer (PHY) specifications, channel wavelengths in the O-band (1260 nm-1360 nm, nm—nanometer) around the following four approximate center wavelengths have been specified: 1295 nm, 1300 nm, 1305 nm, and 1310 nm. In one embodiment, if $\lambda_{1,1}, \lambda_{1,2}, \lambda_{1,3}, \lambda_{1,4}, \ldots, \lambda_{kk,1}, \lambda_{kk,2}, \lambda_{kk,3}$, and $\lambda_{kk,4}$ are selected to be in the O-band, at least some of the four approximate center wavelengths 1295 nm, 1300 nm, 1305 nm, and 1310 nm may be included in the group of different channel wavelengths $\lambda_{1,1}, \lambda_{1,2}, \lambda_{1,3}, \lambda_{1,4}, \ldots, \lambda_{kk,1}, \lambda_{kk,2}, \lambda_{kk,3}$, and $\lambda_{kk,4}$, and the rest may be channel wavelengths with other center wavelengths in the O-band.

For example, which is not meant to be limiting, in the case where kk=4, that is, the optical transceiver 100 is a substantially 400 Gb/s optical transceiver, the group of different channel wavelengths includes 16 channel wavelengths which may, for example, include channel wavelengths having the four approximate center wavelengths 1295 nm, 1300 nm, 1305 nm, and 1310 nm that have been specified in 100 GbE PHY specifications, and 12 other channel wavelengths in the O-band that have center wavelengths with a channel spacing of, for example, about 1 nm. The 12 other channel wavelengths in the O-band that have center wavelengths with a channel spacing of 1 nm may, for example, have the following approximate center wavelengths: 1296 nm, 1297 nm, 1298 nm, 1299 nm, 1301 nm, 1302 nm, 1303 nm, 1304 nm, 1306 nm, 1307 nm, 1308 nm, and 1309 nm.

By way of another example, the group of 16 different channel wavelengths may include channel wavelengths in the O-band that have the 400GE-nR16 center wavelengths proposed in the above-mentioned article entitled "Beyond 100 G Client Optics" of Chris Cole.

In the case where kk=10, that is, the optical transceiver 100 is a substantially 1 Tb/s optical transceiver, the group of different channel wavelengths includes 40 channel wavelengths which may, for example, include 40 channel wavelengths having center wavelengths in the wavelength range 1270 nm-1310 nm with a channel spacing of, for example, about 1 nm.

The different channel wavelengths in the group of different channel wavelengths in each of the case where kk=4 and the case where kk=10 may alternatively be selected so as to have other appropriate channel wavelengths in the O-band, and/or other values of equal (symmetric) channel spacing, or combinations of symmetric channel spacing for various numbers of nearest neighbor channel wavelengths and unequal (asymmetric) channel spacing for other numbers of nearest neighbor channel wavelengths, or asymmetric channel spacing, if desired.

In a case where the different channel wavelengths $\lambda_{1,1}, \lambda_{1,2}, \lambda_{1,3}, \lambda_{1,4}, \ldots, \lambda_{kk,1}, \lambda_{kk,2}, \lambda_{kk,3}$, and $\lambda_{kk,4}$ are channel wavelengths in any of the S, C, and L transmission bands as specified by the ITU, $\lambda_{1,1}, \lambda_{1,2}, \lambda_{1,3}, \lambda_{1,4}, \ldots, \lambda_{kk,1}, \lambda_{kk,2}, \lambda_{kk,3}$, and $\lambda_{kk,4}$ may be any appropriate channel wavelengths in grids with, for example, 100 GHz or 200 GHz channel spacing as specified by the ITU for the S, C, and L transmission bands, respectively, or channel wavelengths that include some channel wavelengths that are in the ITU grids and other channel wavelengths that are not in the ITU grids, or channel wavelengths that include only channel wavelengths that are not in the ITU grids.

After tuning to the sets of four channel wavelengths, each tunable optical transmitter 125 uses its set of four channel wavelengths for transmission of optical signals in a wavelength division multiplexed form to a 1:4 wavelength division demultiplexer 135 associated therewith, with 25 Gb/s optical signals being carried over every one of the four channel wavelengths. The 1:4 wavelength division demultiplexers 135 demultiplex the received optical signals using wavelength division demultiplexing to produce substantially 25 Gb/s optical signals over each of 4×kk different channel wavelengths. In the case where kk=4, that is the optical transmitter 105 is a substantially 400 Gb/s optical transmitter, substantially 25 Gb/s optical signals over each of 16 different channel wavelengths $\lambda_{1,1}, \lambda_{1,2}, \lambda_{1,3}, \lambda_{1,4}, \ldots, \lambda_{4,1}, \lambda_{4,2}, \lambda_{4,3}$, and $\lambda_{4,4}$ are outputted from the 1:4 wavelength division demultiplexers 135, and in the case where kk=10, that is the optical transmitter 105 is a substantially 1 Tb/s optical transmitter, substantially 25 Gb/s optical signals over each of 40 different channel wavelengths $\lambda_{1,1}, \lambda_{1,2}, \lambda_{1,3}, \lambda_{1,4}, \ldots, \lambda_{10,1}, \lambda_{10,2}, \lambda_{10,3}$, and $\lambda_{10,4}$ are outputted from the 1:4 wavelength division demultiplexers 135.

The optical signals over the 4×kk different channels wavelengths outputted by the 1:4 wavelength division demultiplexers 135 are provided to the wavelength division multiplexer 140 which multiplexes the substantially 25 Gb/s optical signals of the 4×kk different channel wavelengths. In the case where the optical transmitter 105 is a substantially 400 Gb/s optical transmitter, the wavelength division multiplexer 140 multiplexes the substantially 25 Gb/s optical signals of the 16 different channel wavelengths to generate a substantially 400 Gb/s optical signal which is transmitted via the port 115 over the optical fiber with which the port 115 is associated. In the case where the optical transmitter 105 is a substantially 1000 Gb/s optical transmitter, the wavelength division multiplexer 140 multiplexes the substantially 25

Gb/s optical signals of the 40 different channel wavelengths to generate a substantially 1000 Gb/s optical signal which is transmitted via the port 115 over the optical fiber with which the port 115 is associated.

In reception operation, a 400/1000 Gb/s optical signal is received over the optical fiber with which the port 120 is associated. The 400/1000 Gb/s optical signal is a wavelength division multiplexed optical signal resulting from wavelength division multiplexing of 25 Gb/s optical signals carried over 16/40 different channel wavelengths.

In a case where the optical receivers 145 are substantially 100 Gb/s colorless optical receivers, the substantially 100 Gb/s colorless optical receivers are capable of using the 16/40 different channel wavelengths. In a case where the optical receivers 145 are substantially 100 Gb/s tunable optical receivers, each substantially 100 Gb/s tunable optical receiver is tuned so as to use a set of four channel wavelengths that are different from channel wavelengths used by another substantially 100 Gb/s tunable optical receiver, and so that the channel wavelengths of the sets of four channel wavelengths match the 16/40 different channel wavelengths of the 400/1000 Gb/s optical signal, which are typically also the 16/40 different channel wavelengths used by the optical transmitter 105. In one embodiment, tuning of the substantially 100 Gb/s tunable optical receivers to the sets of four channel wavelengths may be automatically performed in response to instructions provided by the controllers associated with the transmitters 125 and the receivers 145. In another embodiment, tuning of the substantially 100 Gb/s tunable optical receivers to the sets of four channel wavelengths may be automatically performed in response to instructions provided by the controller 112. In yet another embodiment, tuning of the substantially 100 Gb/s tunable optical receivers to the sets of four channel wavelengths may be automatically performed in response to instructions provided by the controller 112 operating in conjunction with the controllers associated with the transmitters 125 and the receivers 145.

The 400/1000 Gb/s optical signal is demultiplexed by the demultiplexer 160 to produce substantially 25 Gb/s optical signals over the 16/40 different channel wavelengths. The substantially 25 Gb/s optical signals over the 16/40 different channel wavelengths are provided to the 4:1 wavelength division multiplexers 155 so that each 4:1 wavelength division multiplexer 155 receives substantially 25 Gb/s optical signals over four different channel wavelengths at which it operates.

Each of the 4:1 wavelength division multiplexers 155 multiplexes, using WDM, the 25 Gb/s optical signals received thereat over the four different channel wavelengths at which it operates to produce a substantially 100 Gb/s optical signal. The resulting 4/10 substantially 100 Gb/s optical signals produced by the 4:1 wavelength division multiplexers 155 are respectively provided to the 4/10 substantially 100 Gb/s C/T optical receivers 145, which are operative to receive the resulting 4/10 substantially 100 Gb/s optical signals.

The set of substantially 100 Gb/s tunable optical transmitters 125 together with the set of substantially 100 Gb/s C/T optical receivers 145 forms a set of substantially 100 Gb/s tunable optical transceivers including transmitter 125-receiver 145 pairs. Each such substantially 100 Gb/s tunable optical transceiver may be a first generation (GEN1) substantially 100 Gb/s tunable optical transceiver as described below with reference to FIG. 2 or a second generation (GEN2) substantially 100 Gb/s tunable optical transceiver as described below with reference to FIG. 3. The set of substantially 100 Gb/s tunable optical transceivers may include only GEN1 substantially 100 Gb/s tunable optical transceivers, or only GEN2 substantially 100 Gb/s tunable optical transceivers, or a combination of one or more, but not all, GEN1 substantially 100 Gb/s tunable optical transceivers and one or more, but not all, GEN2 substantially 100 Gb/s tunable optical transceivers. In some embodiments, each such substantially 100 Gb/s tunable optical transceiver, or the entire set of substantially 100 Gb/s tunable optical transceivers together with the OTRIN 130 and the ORCVIN 150, may be integrated in one or more photonic integrated circuits (PICs).

The OTRIN 130 together with the ORCVIN 150 may be viewed as an interface for conversion from 100 Gb/s to 400/1000 Gb/s and from 400/1000 Gb/s to 100 Gb/s in which the OTRIN 130 converts 4/10 substantially 100 Gb/s optical signals into a substantially 400/1000 Gb/s optical signal for transmission, and the ORCVIN 150 converts a substantially 400/1000 Gb/s optical signal into 4/10 substantially 100 Gb/s optical signals for reception.

Figure 2:
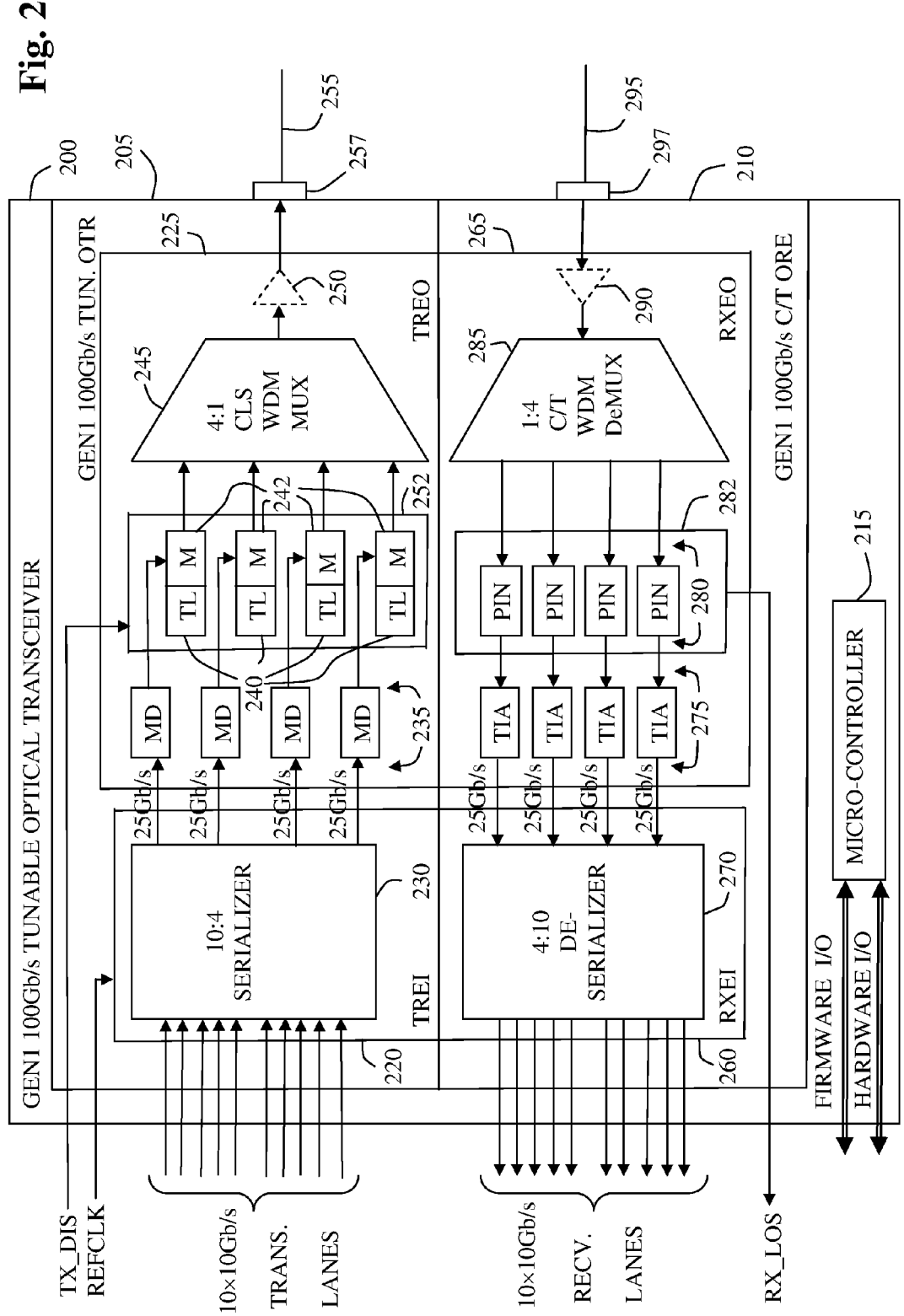
FIG. 2 is a simplified block diagram illustration of a first generation (GEN1) substantially 100 Gb/s tunable optical transceiver usable in the substantially 400/1000 Gb/s optical transceiver of FIG. 1, the GEN1 substantially 100 Gb/s tunable optical transceiver being constructed and operative in accordance with an embodiment of the present invention.

Reference is now additionally made to FIG. 2, which is a simplified block diagram illustration of a first generation (GEN1) substantially 100 Gb/s tunable optical transceiver usable in the substantially 400/1000 Gb/s optical transceiver of FIG. 1, the GEN1 substantially 100 Gb/s tunable optical transceiver being constructed and operative in accordance with an embodiment of the present invention.

The GEN1 substantially 100 Gb/s tunable optical transceiver of FIG. 2, which is generally designated 200, includes a GEN1 substantially 100 Gb/s tunable optical transmitter 205, a GEN1 substantially 100 Gb/s colorless or tunable (C/T) optical receiver 210, and a micro-controller 215 or any other appropriate controller. In one embodiment, every single one of the substantially 100 Gb/s tunable optical transmitters 125 and every single one of the substantially 100 Gb/s C/T optical receivers 145 may be implemented by the GEN1 substantially 100 Gb/s tunable optical transmitter 205 and the GEN1 substantially 100 Gb/s C/T optical receiver 210, respectively. In another embodiment, every single one of a subset including some, but not all, of the substantially 100 Gb/s tunable optical transmitters 125 and every single one of a corresponding subset including some, but not all, of the substantially 100 Gb/s C/T optical receivers 145 may be implemented by the GEN1 substantially 100 Gb/s tunable optical transmitter 205 and the GEN1 substantially 100 Gb/s C/T optical receiver 210, respectively.

The first generation substantially 100 Gb/s tunable optical transceiver 200 has an architecture which is similar to a GEN1, 100GBASE-ER4 (100 G designates the speed in Gb/s, BASE—refers to baseband transmission, E—refers to extended reach of at least 40 kilometer (km), R—refers to the use of 64-bit word/66-bit word (64B/66B) encoding, and 4—refers to the number of wavelengths used) or 100GBASE-LR4 (L—refers to long reach of at least 10 km) transceiver architecture, for example as described and shown in the above-mentioned article entitled "100 Gigabit Ethernet and Beyond", of John D'Ambrosia, except for the following differences: (a) in the transmitter part, tunable lasers (TLs), which may also operate at other wavelengths in the O-band than the ones specified for 100GBASE-ER4 and 100GBASE-LR4 or at wavelengths in other ITU specified transmission bands, together with typically external modulators (Ms) and modulation drivers (MDs) of the modulators replace electro-modulation lasers (EMLs) and MDs of the EMLs of the GEN1, 100GBASE-ER4 transceiver architecture and direct modulation lasers (DMLs) and laser drivers (LDs) of the DMLs of the GEN1, 100GBASE-LR4 transceiver architecture, (b) in the transmitter part, a colorless wavelength division multiplexer replaces a wavelength division multiplexer which is not colorless if such wavelength division multiplexer which is not colorless is implemented in any of the GEN1, 100GBASE-ER4 transceiver architecture and the GEN1, 100GBASE-LR4 transceiver architecture, (c) in the receiver part, a colorless or tunable wavelength division demultiplexer replaces a wavelength division demultiplexer which is not colorless or tunable if such wavelength division demultiplexer which is not colorless or tunable is implemented in any of the GEN1, 100GBASE-ER4 transceiver architecture and the GEN1, 100GBASE-LR4 transceiver architecture, (d) tuning to different channel wavelengths is controlled and enabled, and (e) semiconductor optical amplifiers (SOAs) or other optical amplifiers, if used, operate at wavelengths used by the transmitter part and the receiver part. Such differences are further described herein below.

The optical transmitter 205 includes a transmitter electrical interface (TREI) 220, and a transmitter electro-optical interface (TREO) 225 which is operatively associated with the TREI 220. The TREI 220 is associated with ten transmission electrical lanes operating at substantially 10 Gb/s lane rates, and receives 10×10 Gb/s electrical signals over the ten transmission electrical lanes. The TREI 220 includes a 10:4 serializer circuit 230, which may be comprised in one or more integrated circuits (ICs).

In one embodiment, the 10:4 serializer circuit 230 may be implemented by two 5:2 serializer circuits.

The TREO 225 includes four MDs 235, four TLs 240, four external modulators 242, a 4:1 colorless (CLS) wavelength division multiplexer 245, and optionally an SOA 250 or any other appropriate optical amplifier. Each TL 240 typically includes a conventional tunable laser module having a tuning and locking mechanism and typically mounted to a thermoelectric cooler (TEC) (all not shown). Each TL 240 is also integrated with or associated with a respective one of the external modulators 242. Each external modulator 242 may include a conventional external modulator, such as, by way of a non-limiting example, a Mach-Zehnder modulator or an electroabsorption modulator.

In the embodiment of FIG. 2 the TLs 240 together with the external modulators 242 are, by way of a non-limiting example, integrated in a single unit 252. A Transmit Disable (TX_DIS) control signal, typically received from a host (not shown) using, for example, a hardware control pin in an electrical connector (both not shown) of the transceiver 200 which is connected to the unit 252 may, for example, be used to enable or disable operation of the TLs 240.

In some embodiments in which the TLs 240 operate in the C or L bands, the TLs 240 may include integrable tunable laser assemblies.

The TLs 240 may be tunable across one or more desired bands or one or more sub-bands, and may, for example, include conventional tunable lasers that are tunable across one of the O, S, C and L bands or across specific combinations of two of the S, C and L bands, such as the following non-limiting examples of conventional tunable lasers: the CW-TOSA Integrable Tunable Laser Assemblies 5205-T/5206-T ITLA of JDS Uniphase Corporation of California, USA of which 5205-T is tunable over the standard and extended C-band and 5206-T is tunable over the L-band; the LambdaFLEX™ ITLA TL5000VCJ Integrable Tunable Laser Assembly with variable output power of Oclaro, Inc. of California, USA that is tunable across the C-band window of 1528-1563 nm; and the PICO D Series Continuously Tunable OEM Lasers (1260-1630 nm) of Thorlabs, Inc. of New Jersey, USA, selected models of which may be tuned across selected ones of the O-band, the S and C-bands, or across the C and L bands.

The SOA 250 may not be required for the long reach of at least 10 km, and may be preferable for the extended reach of at least 40 km. The SOA 250 may include a conventional SOA, such as, by way of a non-limiting example, the QLight® SAO11b SOA for a case where the TLs 240 operate at wavelengths between 1290 nm and 1330 nm, the QLight® SAC11b SOA for a case where the TLs 240 operate at wavelengths between 1530 nm and 1570 nm, the QLight® SAO20r SOA for a case where the TLs 240 operate at wavelengths between 1250 nm and 1350 nm, and the QLight® SAC20r SOA for a case where the TLs 240 operate at wavelengths between 1450 nm and 1600 nm, where the QLight® SAO11b, SAC11b, SAO20r and SAC20r SOAs are all commercially available from Alphion Corporation of New Jersey, USA.

In some embodiments, each TL 240 may include an SOA (not shown), in which cases the SOA 250 is not required even for the extended reach.

The SOA 250, or the multiplexer 245 in a case where the SOA 250 is not used, is coupled to a single mode fiber (SMF) 255 via a port 257.

The multiplexer 245 may, for example, include a colorless AWG or a colorless 4×1 coupler or other colorless passive 4×1 combiner as described above in connection with the 4:1 wavelength division multiplexers 155 of FIG. 1.

The 10:4 serializer circuit 230 employs a reference clock signal REFCLK and translates 10×10 Gb/s into 4×25 Gb/s by converting the ten transmission electrical lanes operating at substantially 10 Gb/s lane rates into 4 electrical lanes at substantially 25 Gb/s lane rates. The four electrical lanes at substantially 25 Gb/s lane rates are associated with the four MDs 235, respectively. The TLs 240 operate to generate light continuously and the four MDs 235 drive the four external modulators 242 to effect transmission of four substantially 25 Gb/s optical signals to the multiplexer 245 over four optical lanes using four wavelengths, respectively. The multiplexer 245 multiplexes the optical signals using WDM to generate substantially 100 Gb/s optical signals. The substantially 100 Gb/s optical signals may be amplified by the optional SOA 250, and transmitted, for example over the SMF 255 via the port 257.

The optical receiver 210 includes a receiver electrical interface (RXEI) 260, and a receiver electro-optical interface (RXEO) 265 which is operatively associated with the RXEI 260. The RXEI 260 includes a 4:10 de-serializer circuit 270, which, in one embodiment, may me implemented by two 2:5 de-serializer circuits. The 4:10 de-serializer circuit 270 translates 4×25 Gb/s into 10×10 Gb/s by converting 4 electrical lanes at substantially 25 Gb/s lane rates into the receiving electrical lanes operating at substantially 10 Gb/s lane rates. The 4:10 de-serializer circuit 270 may be integrated in one or more ICs, and is associated with ten receiving electrical lanes operating at substantially 10 Gb/s lane rates.

A combination of one of the serializer circuit 230 with the de-serializer circuit 270 is referred to as a serializer/de-serializer (SerDes) circuit. The optical transceiver 200 therefore includes a 10:4 SerDes circuit, which may, in one embodiment, be implemented by two 5:2 SerDes circuits. In one embodiment, the 10:4 SerDes circuit may be integrated in one or more ICs.

In one embodiment, the TREI 220 and the RXEI 260 may be integrated in one or more ICs, and the de-serializer circuit 270 may also receive and employ the reference clock signal REFCLK.

The RXEO 265 includes four transimpedance amplifiers (TIAs) 275, four PIN (positive-intrinsic-negative) photodiodes 280 that may be embodied in a single unit 282, a 1:4 C/T wavelength division demultiplexer 285, and optionally an SOA 290 or any other appropriate optical amplifier. In one embodiment, avalanche photodiodes (APDs) may replace the PIN photodiodes 280.

The SOA 290 may not be required for the long reach of at least 10 km, and may be preferable for the extended reach of at least 40 km. The SOA 290 may include a conventional SOA that may, by way of a non-limiting example, be similar to the SOA 250. The SOA 290, or the demultiplexer 285 in a case where the SOA 290 is not used, is coupled to an SMF 295 via a port 297 and receives substantially 100 Gb/s optical signals over the SMF 295.

In a case where the demultiplexer 285 is a colorless wavelength division demultiplexer, the colorless wavelength division demultiplexer may include a colorless AWG as described above in connection with the 1:4 wavelength division demultiplexers 135 of FIG. 1. In a case where the demultiplexer 285 is a tunable wavelength division demultiplexer, the tunable wavelength division demultiplexer may include a 1×4 decoupler or other passive 1×4 splitter together with WSDs which include tunable optical filters as described above in connection with the 1:4 wavelength division demultiplexers 135 of FIG. 1.

The micro-controller 215 may be operative to identify and report faults, such as thermal deviation faults, and may perform transceiver control and adjustment operations, such as, by way of a non-limiting example, adjustment of settings of the MDs 235 and the TIAs 275, and TEC control and thermal management and control of the TLs 240, the multiplexer 245, and the demultiplexer 285. The micro-controller 215 is operatively associated with the TREO 225 and the RXEO 265 and is also operative to control the TREO 225 for tuning and locking the TLs 240 to a desired set of four wavelengths by controlling the tuning mechanisms of the TLs 240. In a case where the demultiplexer 285 is tunable, the micro-controller 215 also controls tuning of the demultiplexer 285 in the RXEO 265, for example by tuning the tunable optical filters of the demultiplexer 285. In one embodiment, controlling the TREO 225 for tuning and locking the TLs 240 to the desired set of four wavelengths and controlling tuning of the demultiplexer 285 in the RXEO 265 in the case where the demultiplexer 285 is tunable may be automatically performed in response to a selection or instruction received at the micro-controller 215 from a host (not shown) communicating therewith.

In one embodiment, the TREO 225 and the RXEO 265 may be integrated in one or more PICs. In another embodiment, the entire transceiver 200 may be integrated in one or more PICs.

In transmission operation, substantially 10 Gb/s optical signals provided over the ten transmission electrical lanes (10×10 Gb/s) are converted, by the 10:4 serializer circuit 230, into 4×25 Gb/s electrical signals, which are provided to the MDs 235 for driving the external modulators 242 to effect transmission of 4×25 Gb/s optical signals to the multiplexer 245 over the four optical lanes. The micro-controller 215 tunes the TLs 240 to a selected set of four wavelengths which are usable over the four optical lanes and by the multiplexer 245.

The multiplexer 245 multiplexes the optical signals received thereat over the four channel wavelengths using WDM thus generating a substantially 100 Gb/s optical signal. The substantially 100 Gb/s optical signal is amplified by the SOA 250, in the case where the SOA 250 is used, and transmitted over the SMF 255 via the port 257.

In the embodiment of FIG. 2 the substantially 100 Gb/s optical signal transmitted by the optical transmitter 205 therefore includes 4×25 Gb/s optical signals over a selected set of four channel wavelengths in a wavelength division multiplexed form.

In reception operation, a substantially 100 Gb/s optical signal that includes 4×25 Gb/s optical signals over a set of four channel wavelengths in a wavelength division multiplexed form is provided over the SMF 295 and via the port 297 to the demultiplexer 285, optionally after amplification by the SOA 290. The set of four channel wavelengths is also typically used by the transmitter 205 for transmission over the SMF 255 and is usable by the demultiplexer 285 in the case where the demultiplexer 285 is a colorless wavelength division demultiplexer. In the case where the demultiplexer 285 is a tunable wavelength division demultiplexer, the micro-controller 215 tunes the demultiplexer 285 to the set of four channel wavelengths.

The demultiplexer 285 demultiplexes the substantially 100 Gb/s optical signal to produce four separate substantially 25 Gb/s optical signals over the four channel wavelengths. The four PIN photodiodes 280 respectively receive the four separate substantially 25 Gb/s optical signals from the demultiplexer 285, convert the four separate substantially 25 Gb/s optical signals into four separate substantially 25 Gb/s electrical signals, and provide the four separate substantially 25 Gb/s electrical signals to the four TIAs 275, respectively. In a case where the PIN photodiodes 280 experience an optical signal power below a predefined threshold, the PIN photodiodes 280 may, for example, output a receiver loss of signal (RX_LOS) to the host, for example using a hardware alarm pin in an electrical connector (both not shown) of the transceiver 200 which may be connected to the unit 282.

The TIAs 275 amplify the received substantially 25 Gb/s electrical signals and provide substantially 25 Gb/s amplified electrical signals to the de-serializer circuit 270, which employs the reference clock signal REFCLK and converts the four substantially 25 Gb/s electrical signals into ten substantially 10 Gb/s electrical signals, which are then provided to the ten receiving electrical lanes, respectively.

Figure 3:
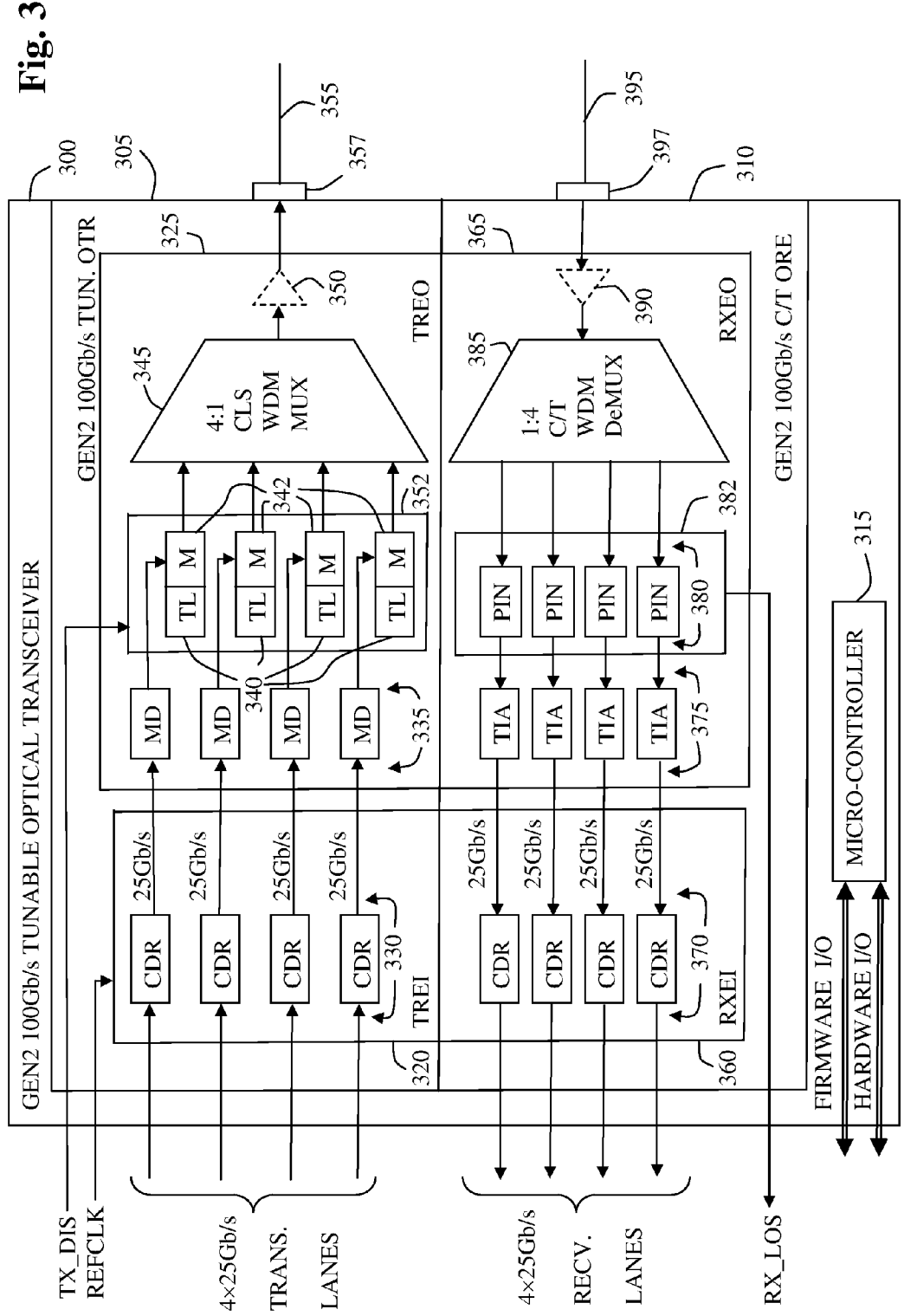
FIG. 3 is a simplified block diagram illustration of a second generation (GEN2) substantially 100 Gb/s tunable optical transceiver usable in the substantially 400/1000 Gb/s optical transceiver of FIG. 1, the GEN2 substantially 100 Gb/s tunable optical transceiver being constructed and operative in accordance with a further embodiment of the present invention.

Reference is now additionally made to FIG. 3, which is a simplified block diagram illustration of a second generation (GEN2) substantially 100 Gb/s tunable optical transceiver usable in the substantially 400/1000 Gb/s optical transceiver of FIG. 1, the GEN2 substantially 100 Gb/s tunable optical transceiver being constructed and operative in accordance with a further embodiment of the present invention.

The GEN2 substantially 100 Gb/s tunable optical transceiver of FIG. 3, which is generally designated 300, includes a GEN2 substantially 100 Gb/s tunable optical transmitter 305, a GEN2 substantially 100 Gb/s colorless or tunable (C/T) optical receiver 310, and a micro-controller 315 or any other appropriate controller. In one embodiment, every single one of the substantially 100 Gb/s tunable optical transmitters 125 and every single one of the substantially 100 Gb/s C/T optical receivers 145 may be implemented by the GEN2 substantially 100 Gb/s tunable optical transmitter 305 and the GEN2 substantially 100 Gb/s C/T optical receiver 310, respectively. In another embodiment, every single one of a subset including some, but not all, of the substantially 100 Gb/s tunable optical transmitters 125 and every single one of a corresponding subset including some, but not all, of the substantially 100 Gb/s C/T optical receivers 145 may be implemented by the GEN2 substantially 100 Gb/s tunable optical transmitter 305 and the GEN2 substantially 100 Gb/s C/T optical receiver 310, respectively.

The second generation substantially 100 Gb/s tunable optical transceiver 300 has an architecture which is similar to a GEN2, 100GBASE-ER4 or 100GBASE-LR4 transceiver architecture, for example as described and shown in the above-mentioned article entitled "100 Gigabit Ethernet and Beyond", of John D'Ambrosia, except for the following differences: (1) in the transmitter part, TLs, which may also operate at other wavelengths in the O-band than the ones specified for 100GBASE-ER4 and 100GBASE-LR4 or at wavelengths in other ITU specified transmission bands, together with typically external modulators (Ms) and MDs of the modulators replace EMLs and MDs of the EMLs of the GEN2, 100GBASE-ER4 transceiver architecture and DMLs and LDs of the DMLs of the GEN2, 100GBASE-LR4 transceiver architecture, (2) in the transmitter part, a colorless wavelength division multiplexer replaces a wavelength division multiplexer which is not colorless if such wavelength division multiplexer which is not colorless is implemented in any of the GEN2, 100GBASE-ER4 transceiver architecture and the GEN2, 100GBASE-LR4 transceiver architecture, (3) in the receiver part, a colorless or tunable wavelength division demultiplexer replaces a wavelength division demultiplexer which is not colorless or tunable if such wavelength division demultiplexer which is not colorless or tunable is implemented in any of the GEN2, 100GBASE-ER4 transceiver architecture and the GEN2, 100GBASE-LR4 transceiver architecture, (4) tuning to different channel wavelengths is controlled and enabled, and (5) SOAs or other optical amplifiers, if used, operate at wavelengths used by the transmitter part and the receiver part. Such differences are further described herein below.

The transceiver 300 is similar to the transceiver 200, except for electrical interface differences as described below, and that the transceiver 300 is associated with and operates on four transmission electrical lanes operating at substantially 25 Gb/s lane rates and four receiving electrical lanes operating at substantially 25 Gb/s lane rates instead of the ten transmission electrical lanes operating at substantially 10 Gb/s lane rates and the ten receiving electrical lanes operating at substantially 10 Gb/s lane rates with which the transceiver 200 is associated and on which the transceiver 200 operates.

The optical transmitter 305 includes a TREI 320, and a TREO 325 which is operatively associated with the TREI 320. The TREI 320 is associated with the four transmission electrical lanes operating at substantially 25 Gb/s lane rates, and receives 4×25 Gb/s electrical signals over the four transmission electrical lanes. The TREI 320 includes four clock and data recovery units (CDRs) 330, which may be integrated in one or more ICs. The TREO 325 is similar in structure and functionality to the TREO 225, and includes four MDs 335, four TLs 340, four external modulators (Ms) 342, a 4:1 colorless (CLS) wavelength division multiplexer 345, and optionally an SOA 350, which are similar in structure and functionality to the MDs 235, the TLs 240, the external modulators 242, the multiplexer 245, and the SOA 250, respectively. In the embodiment of FIG. 3 the TLs 340 together with the external modulators 342 are, by way of a non-limiting example, integrated in a single unit 352, which may be similar to the unit 252. The SOA 350 may alternatively be replaced by any other appropriate optical amplifier.

The SOA 350 may not be required for the long reach of at least 10 km, and may be preferable for the extended reach of at least 40 km. In some embodiments, each TL 340 may include an SOA (not shown), in which cases the SOA 350 is not required even for the extended reach.

The SOA 350, or the multiplexer 345 in a case where the SOA 350 is not used, is coupled to an SMF 355 via a port 357.

The CDRs 330 employ a reference clock signal REFCLK and recover clock and data of the four transmission electrical lanes thus producing four recovered electrical lanes. The four recovered electrical lanes are associated with the four MDs 335, respectively. The TLs 340 operate to generate light continuously and the four MDs 335 drive the four external modulators 342 to effect transmission of four substantially 25 Gb/s optical signals to the multiplexer 345 over four optical lanes using four wavelengths, respectively. The multiplexer 345 multiplexes the optical signals using WDM to generate substantially 100 Gb/s optical signals. The substantially 100 Gb/s optical signals may be amplified by the optional SOA 350, and transmitted, for example over the SMF 355 via the port 357.

The optical receiver 310 includes an RXEI 360, and an RXEO 365 which is operatively associated with the RXEI 360. The RXEI 360 includes four CDRs 370, which may be integrated in one or more ICs, and are associated with four receiving electrical lanes operating at substantially 25 Gb/s lane rates. In one embodiment, the CDRs 370 may also receive and employ the reference clock signal REFCLK used by the CDRs 330.

The RXEO 365 is similar in structure and functionality to the RXEO 265, and includes four TIAs 375, four PIN photodiodes 380 that may be embodied in a single unit 382, a 1:4 C/T wavelength division demultiplexer 385, and optionally an SOA 390, which are similar in structure and functionality to the TIAs 275, the PIN photodiodes 280, the demultiplexer 285, and the SOA 290, respectively. The unit 382 may be similar to the unit 282. The SOA 390 may alternatively be replaced by any other appropriate optical amplifier. In one embodiment, APDs may replace the PIN photodiodes 380.

The SOA 390 may not be required for the long reach of at least 10 km, and may be preferable for the extended reach of at least 40 km. The SOA 390, or the demultiplexer 385 in a case where the SOA 390 is not used, is coupled to an SMF 395 via a port 397 and receives substantially 100 Gb/s optical signals over the SMF 395.

The micro-controller 315 is similar in structure and functionality to the micro-controller 215 and may perform operations which are similar to the operations performed by the micro-controller 215.

In one embodiment, the TREO 325 and the RXEO 365 may be integrated in one or more PICs. In another embodiment, the entire transceiver 300 may be integrated in one or more PICs.

The electrical interface differences between the transceiver 200 and the transceiver 300 therefore reside in that the electrical interfaces TREI 220 and RXEI 260 of the transceiver 200 use one or more SerDes circuits whereas the electrical interfaces TREI 320 and RXEI 360 of the transceiver 300 use CDRs.

In transmission operation, clock and data of substantially 25 Gb/s optical signals provided over the four transmission electrical lanes (4×25 Gb/s) are recovered by the CDRs 330, and the recovered electrical signals are provided to the MDs 335 for driving the external modulators 342 to effect transmission of 4×25 Gb/s optical signals to the multiplexer 345 over the four optical lanes. The micro-controller 315 tunes the TLs 340 to a selected set of four wavelengths which are usable over the four optical lanes and by the multiplexer 345.

The multiplexer 345 multiplexes the optical signals received thereat over the four channel wavelengths using WDM thus generating a substantially 100 Gb/s optical signal. The substantially 100 Gb/s optical signal is amplified by the SOA 350, in the case where the SOA 250 is used, and transmitted over the SMF 355 via the port 357.

In the embodiment of FIG. 3 the substantially 100 Gb/s optical signal transmitted by the optical transmitter 305 therefore includes 4×25 Gb/s optical signals over a selected set of four channel wavelengths in a wavelength division multiplexed form.

In reception operation, a substantially 100 Gb/s optical signal that includes 4×25 Gb/s optical signals over a set of four channel wavelengths in a wavelength division multiplexed form is provided over the SMF 395 and via the port 397 to the demultiplexer 385, optionally after amplification by the SOA 390. The set of four channel wavelengths is also typically used by the transmitter 305 for transmission over the SMF 355 and is usable by the demultiplexer 385 in the case where the demultiplexer 385 is a colorless wavelength division demultiplexer. In the case where the demultiplexer 385 is a tunable wavelength division demultiplexer, the micro-controller 315 tunes the demultiplexer 385 to the set of four channel wavelengths.

The demultiplexer 385 demultiplexes the substantially 100 Gb/s optical signal to produce four separate substantially 25 Gb/s optical signals over the four channel wavelengths. The four PIN photodiodes 380 respectively receive the four separate substantially 25 Gb/s optical signals from the demultiplexer 385, convert the four separate substantially 25 Gb/s optical signals into four separate substantially 25 Gb/s electrical signals, and provide the four separate substantially 25 Gb/s electrical signals to the four TIAs 375, respectively. In a case where the PIN photodiodes 380 experience an optical signal power below a predefined threshold, the PIN photodiodes 380 may, for example, output a receiver loss of signal (RX_LOS) to a host (not shown), for example using a hardware alarm pin in an electrical connector (both not shown) of the transceiver 300 which may be connected to the unit 382.

The TIAs 375 amplify the received substantially 25 Gb/s electrical signals and provide substantially 25 Gb/s amplified electrical signals to the CDRs 370, which recover clock and data of the substantially 25 Gb/s amplified electrical signals and provide the recovered substantially 25 Gb/s electrical signals to the four receiving electrical lanes, respectively.

Except for being building blocks of the substantially 400/1000 Gb/s optical transceiver 100 as described herein above, each of the transceivers 200 and 300 may also be operated as a 100 Gb/s optical transceiver in stand-alone communication at substantially 100 Gb/s. In accordance with an embodiment of the present invention, each of the transceivers 200 and 300 may operate in two modes under control of a respective one of the micro-controller 215 and the micro-controller 315. In a first mode, a transceiver 200/300 operates at the four approximate center wavelengths 1295 nm, 1300 nm, 1305 nm, and 1310 nm defined for 100 GbE in the 100 GbE PHY specifications when it is used for stand-alone communication at substantially 100 Gb/s. In a second mode, the transceiver 200/300 operates at wavelengths which are different from wavelengths used by at least one additional substantially 100 Gb/s optical transceiver and which are suitable for WDM therewith when the transceiver 200/300 is used together with the at least one additional substantially 100 Gb/s optical transceiver for communication in a wavelength division multiplexed form at a bit rate greater than or equal to substantially 200 Gb/s. Operation of the transceiver 200/300 at the wavelengths specified above means that the TLs 240/340 are tuned, under control of the respective one of the micro-controller 215 and the micro-controller 315, to operate at the specified wavelengths, that the 4:1 colorless wavelength division multiplexer 245/345 is suitable for use at the specified wavelengths, and that the 1:4 colorless or tunable wavelength division demultiplexer 285/385 is suitable for use at the specified wavelengths or tuned to the specified wavelengths.

In one embodiment, one of the first mode and the second mode is determined prior to operating the transceiver 200/300. In one embodiment, determination of the one of the first mode and the second mode is made automatically, such as by a host or other communication equipment (both not shown). In another embodiment, determination of the one of the first mode and the second mode is made automatically in response to at least one of the following: an instruction of a network operator; and a selection by the network operator. In one embodiment, an indication identifying the determined one of the first mode and the second mode is transmitted to a respective one of the micro-controllers 215 and 315 for use by the respective one of the micro-controllers 215 and 315 to configure tuning of the transceiver 200/300. The indication may, for example, be transmitted by the host or other communication equipment or from a network operator's terminal.

Figure 4:
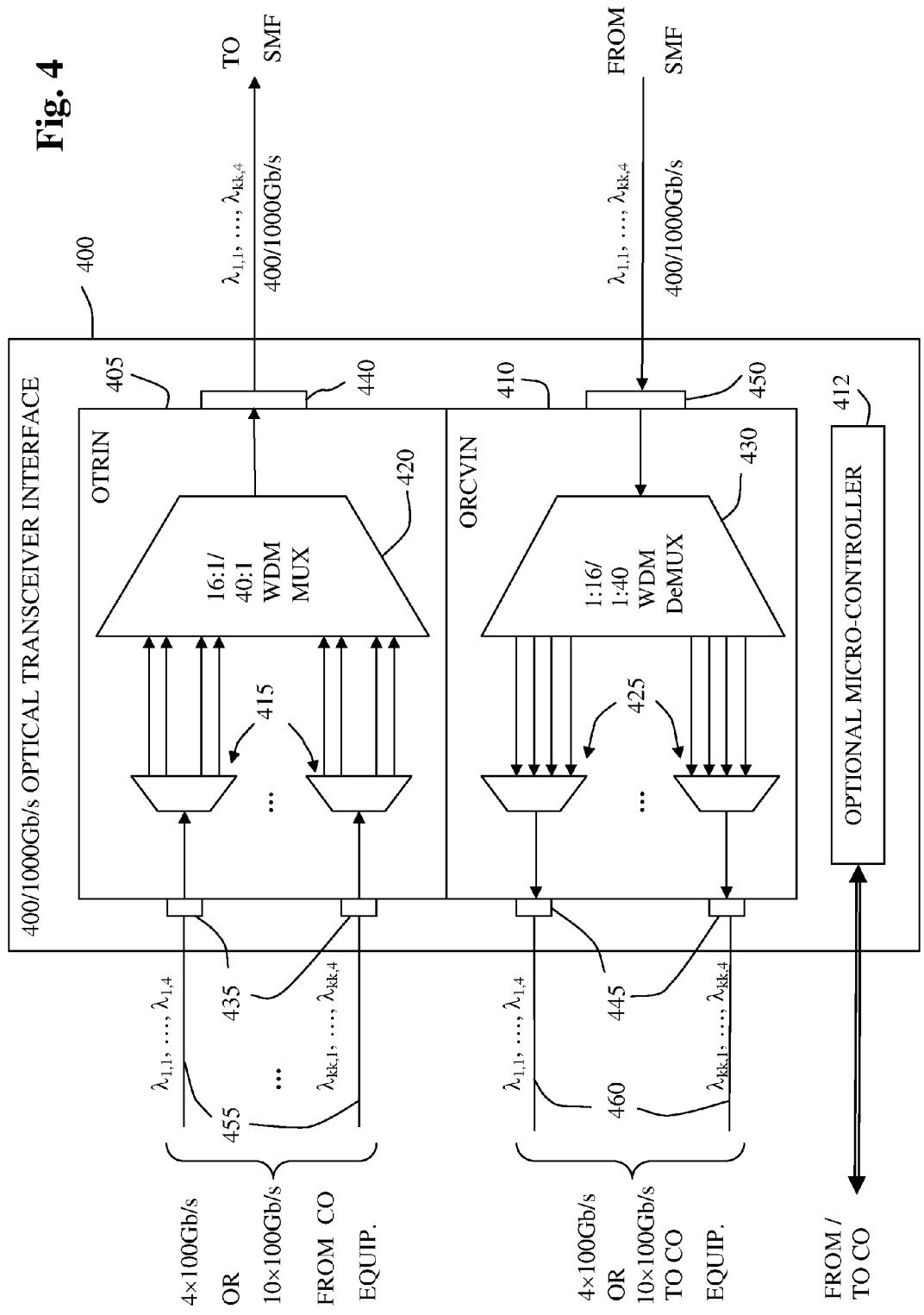
FIG. 4 is a simplified block diagram illustration of a substantially 400/1000 Gbs optical transceiver interface constructed and operative in accordance with an embodiment of the present invention.

Operation of the transceiver 200/300 in the two modes may be useful, for example, in a case where a central office (CO) (not shown) that utilizes a plurality of transceivers 200 and/or 300 uses some transceivers 200 and/or 300 for stand-alone communication at substantially 100 Gb/s, and combinations of some other transceivers 200 and/or 300 for communication at a bit rate greater than or equal to substantially 200 Gb/s, such as a bit rate of substantially 400/1000 Gb/s. In such a case, the transceivers 200 and/or 300 may, for example, be comprised in or associated with CO equipment (not shown) that switches or routes a plurality of substantially 100 Gb/s optical signals from/to the transceivers 200 and/or 300, and a separate substantially 400/1000 Gbs optical transceiver interface, which communicates with the CO equipment and may be comprised in or associated with the CO equipment, is used for the communication at substantially 400/1000 Gb/s. The CO equipment may include, for example, equipment such as a communication switch, a router, a node server, an optical add-drop multiplexer (OADM), or combinations thereof. FIG. 4, to which reference is now additionally made, is a simplified block diagram illustration of such a substantially 400/1000 Gbs optical transceiver interface, which is constructed and operative in accordance with an embodiment of the present invention.

The substantially 400/1000 Gbs optical transceiver interface of FIG. 4, which is generally designated 400, includes an OTRIN 405, an ORCVIN 410, and optionally a micro-controller 412 or any other appropriate controller. The OTRIN 405 is similar in structure and functionality to the OTRIN 130, and includes a set of 1:4 wavelength division demultiplexers 415 and a wavelength division multiplexer 420 which are similar in structure and functionality to the set of 1:4 wavelength division demultiplexers 135 and the wavelength division multiplexer 140, respectively. The ORCVIN 410 is similar in structure and functionality to the ORCVIN 150, and includes a set of 4:1 wavelength division multiplexers 425 and a wavelength division demultiplexer 430 which are similar in structure and functionality to the set of 4:1 wavelength division multiplexers 155 and the wavelength division demultiplexer 160, respectively. The micro-controller 412 is similar in structure and functionality to the micro-controller 112.

The set of 1:4 wavelength division demultiplexers 415 includes 4 demultiplexers 415 in a case where the optical transceiver interface 400 operates at substantially 400 Gb/s and 10 demultiplexers 415 in a case where the optical transceiver interface 400 operates at substantially 1000 Gb/s. The wavelength division multiplexer 420 is a 16:1 wavelength division multiplexer in the case where the optical transceiver interface 400 operates at substantially 400 Gb/s and a 40:1 wavelength division multiplexer in the case where the optical transceiver interface 400 operates at substantially 1000 Gb/s.

The set of 4:1 wavelength division multiplexers 425 includes 4 multiplexers 425 in the case where the optical transceiver interface 400 operates at substantially 400 Gb/s and 10 multiplexers 425 in the case where the optical transceiver interface 400 operates at substantially 1000 Gb/s. The wavelength division demultiplexer 430 is a 16:1 wavelength division multiplexer in the case where the optical transceiver interface 400 operates at substantially 400 Gb/s and a 40:1 wavelength division demultiplexer in the case where the optical transceiver interface 400 operates at substantially 1000 Gb/s.

In one embodiment, the OTRIN 405 also includes, or is associated with, ports 435 via which the optical transceiver interface 400 receives substantially 100 Gb/s optical signals from CO equipment (not shown) and a port 440 via which the optical transceiver interface 400 transmits substantially 400/1000 Gbs optical signals, for example towards an SMF (not shown), and the ORCVIN 410 also includes, or is associated with, ports 445 via which the optical transceiver interface 400 transmits substantially 100 Gb/s optical signals to the CO equipment and a port 450 via which the optical transceiver interface 400 receives substantially 400/1000 Gbs optical signals, for example from another SMF (not shown).

The substantially 100 Gb/s optical signals received from the CO equipment may, for example, be received over optical fibers 455 in a form of 4×25 Gb/s wavelength division multiplexed optical signals carried over sets of four channel wavelengths which are different for each optical fiber 455. The substantially 100 Gb/s optical signals transmitted to the CO equipment may, for example, be transmitted over optical fibers 460 in a form of 4×25 Gb/s wavelength division multiplexed optical signals carried over sets of four channel wavelengths which are different for each optical fiber 460. The substantially 400/1000 Gbs optical signals transmitted by or received by the optical transceiver interface 400 are in a form of 16×25 Gb/s wavelength division multiplexed optical signals in the case where the optical transceiver interface 400 operates at substantially 400 Gb/s and in a form of 40×25 Gb/s wavelength division multiplexed optical signals in the case where the optical transceiver interface 400 operates at substantially 1000 Gb/s.

In operation, the CO equipment may switch or route a substantially 100 Gb/s optical signal from a substantially 100 Gb/s transceiver, which may be either the transceiver 200 or the transceiver 300, to a 100 Gb/s optical link (not shown) or to a 200 Gb/s optical link, such as a 400/1000 Gb/s optical link provided by the optical fibers 455 and 460 connected to the optical transceiver interface 400.

If the substantially 100 Gb/s optical signal is switched/routed to the 100 Gb/s optical link, the substantially 100 Gb/s transceiver is operated in the first mode, that is in stand-alone communication at substantially 100 Gb/s, for example in response to a first instruction provided from the CO equipment to a respective one of the micro-controllers 215 and 315. When operated in the first mode, the TLs 240, in the implementation of the substantially 100 Gb/s transceiver as the transceiver 200, may be tuned to operate at the four approximate center wavelengths 1295 nm, 1300 nm, 1305 nm, and 1310 nm that have been specified in the 100 GbE PHY specifications and at which the multiplexer 245 is also usable, and the TLs 340, in the implementation of the substantially 100 Gb/s transceiver as the transceiver 300, may be tuned to operate at the four approximate center wavelengths 1295 nm, 1300 nm, 1305 nm, and 1310 nm that have been specified in the 100 GbE PHY specifications and at which the multiplexer 345 is also usable.

In the case where the demultiplexer 285, in the implementation of the substantially 100 Gb/s transceiver as the transceiver 200, is tunable, the micro-controller 215 also tunes the tunable optical filters of the demultiplexer 285 to the four approximate center wavelengths 1295 nm, 1300 nm, 1305 nm, and 1310 nm, and in the case where the demultiplexer 285 is colorless, the four approximate center wavelengths 1295 nm, 1300 nm, 1305 nm, and 1310 nm are usable by the demultiplexer 285. Similarly, in the case where the demultiplexer 385, in the implementation of the substantially 100 Gb/s transceiver as the transceiver 300, is tunable, the micro-controller 315 also tunes the tunable optical filters of the demultiplexer 385 to the four approximate center wavelengths 1295 nm, 1300 nm, 1305 nm, and 1310 nm, and in the case where the demultiplexer 385 is colorless, the four approximate center wavelengths 1295 nm, 1300 nm, 1305 nm, and 1310 nm are usable by the demultiplexer 385.

If the substantially 100 Gb/s optical signal is switched/routed to the ≥200 Gb/s optical link, the substantially 100 Gb/s transceiver is operated in the second mode, for example in response to a second instruction provided from the CO equipment to a respective one of the micro-controllers 215 and 315. The 200 Gb/s optical link accommodates at least two substantially 100 Gb/s optical signals, and therefore the substantially 100 Gb/s optical signal and at least one additional substantially 100 Gb/s optical signal from at least one additional substantially 100 Gb/s optical transceiver are typically switched/routed to the 200 Gb/s optical link. In such a case, the substantially 100 Gb/s optical transceiver is operated at wavelengths which are different from wavelengths used by the at least one additional substantially 100 Gb/s optical transceiver. In one embodiment, the second instruction provided from the CO equipment to a respective one of the micro-controllers 215 and 315 may include a selection of the different wavelengths for operation of the substantially 100 Gb/s optical transceiver and the at least one additional substantially 100 Gb/s optical transceiver.

In order for the substantially 100 Gb/s optical transceiver and the at least one additional substantially 100 Gb/s optical transceiver to operate at different wavelengths, the respective one of the micro-controllers 215 and 315 of the substantially 100 Gb/s optical transceiver selects a first set of wavelengths and tunes tunable elements of the substantially 100 Gb/s optical transceiver, including the TLs 240 and the demultiplexer 285 in a case where the demultiplexer 285 is tunable, or the TLs 340 and the demultiplexer 385 in a case where the demultiplexer 385 is tunable, to operate at the first set of wavelengths. The respective one of the micro-controllers 215 and 315 of the at least one additional substantially 100 Gb/s optical transceiver selects a second set of wavelengths in which the wavelengths are different than the wavelengths of the first set of wavelengths, and tunes the corresponding tunable elements of the at least one additional substantially 100 Gb/s optical transceiver to operate at the second set of wavelengths. Selection of the wavelengths of the first set of wavelengths and the wavelengths of the second set of wavelengths also includes selection of the wavelengths such as to be suitable for WDM with one another.

In the case where the demultiplexers of the substantially 100 Gb/s optical transceiver and the at least one additional substantially 100 Gb/s optical transceiver are colorless, the first set of wavelengths are usable by the demultiplexer 285 or the demultiplexer 385 of the substantially 100 Gb/s optical transceiver, and the second set of wavelengths are usable by the demultiplexer 285 or the demultiplexer 385 of the at least one additional substantially 100 Gb/s optical transceiver.

Accordingly, a plurality of substantially 100 Gb/s optical signals at different wavelengths which are also suitable for WDM are provided to or received from the ≥200 Gb/s optical link. In particular, in the case where the ≥200 Gb/s optical link is a 400/1000 Gb/s optical link provided by the optical fibers 455 and 460 connected to the optical transceiver interface 400, 4/10 substantially 100 Gb/s optical signals at different wavelengths which are suitable for WDM are provided from the CO equipment to the OTRIN 405 of the optical transceiver interface 400 over the optical fibers 455 or provided from the ORCVIN 410 of the optical transceiver interface 400 to the CO equipment over the optical fibers 460, as described herein below.

The OTRIN 405 demultiplexes 4/10 substantially 100 Gb/s optical signals received from the CO equipment using the demultiplexers 415 to produce substantially 25 Gb/s optical signals over each of 16/40 different channel wavelengths, and the multiplexer 420 multiplexes the substantially 25 Gb/s optical signals of the 16/40 different channel wavelengths to generate a substantially 400/1000 Gb/s optical signal for transmission via the port 440. In one embodiment, tuning of the demultiplexers 415 in the OTRIN 405 to the 16/40 different channel wavelengths in a case where the demultiplexers 415 are tunable may be automatically performed in response to instructions provided by the micro-controller 412. In another embodiment, tuning of the demultiplexers 415 in the OTRIN 405 to the 16/40 different channel wavelengths in the case where the demultiplexers 415 are tunable may be automatically performed in response to instructions provided by the CO equipment. In yet another embodiment, tuning of the demultiplexers 415 in the OTRIN 405 to the 16/40 different channel wavelengths in the case where the demultiplexers 415 are tunable may be automatically performed in response to instructions provided by the controller 412 operating in conjunction with the CO equipment.

The ORCVIN 410 uses the demultiplexer 430 to demultiplex a substantially 400/1000 Gb/s optical signal received thereat via the port 450 so as to produce substantially 25 Gb/s optical signals over each of 16/40 different channel wavelengths. The multiplexers 425 multiplex groups of four of the substantially 25 Gb/s optical signals of the 16/40 different channel wavelengths to generate 4/10 substantially 100 Gb/s optical signals in a form of 4×25 Gb/s wavelength division multiplexed optical signals carried over sets of four channel wavelengths, and transmit the 4/10 substantially 100 Gb/s optical signals generated thereby over the optical fibers 460 to the CO equipment. In one embodiment, tuning of the demultiplexer 430 in the ORCVIN 410 to the 16/40 different channel wavelengths in a case where the demultiplexer 430 is tunable may be automatically performed in response to instructions provided by the micro-controller 412. In another embodiment, tuning of the demultiplexer 430 in the ORCVIN 410 to the 16/40 different channel wavelengths in the case where the demultiplexer 430 is tunable may be automatically performed in response to instructions provided by the CO equipment. In yet another embodiment, tuning of the demultiplexer 430 in the ORCVIN 410 to the 16/40 different channel wavelengths in the case where the demultiplexer 430 is tunable may be automatically performed in response to instructions provided by the controller 412 operating in conjunction with the CO equipment.

The OTRIN 405 therefore converts 4/10 substantially 100 Gb/s optical signals into a substantially 400/1000 Gb/s optical signal for transmission, and the ORCVIN 410 converts a substantially 400/1000 Gb/s optical signal into 4/10 substantially 100 Gb/s optical signals for reception.

In accordance with another embodiment of the present invention, each of the transceivers 200 and 300 may be fabricated without its 16/40 WDM elements, that is, without the multiplexer 245 and the demultiplexer 285 in the transceiver 200 and without the multiplexer 345 and the demultiplexer 385 in the transceiver 300, and also without the optional SOAs 250 and 290 in the transceiver 200 and the optional SOAs 350 and 390 in the transceiver 390, in order to enable operation of the transceivers 200 and 300 in a parallel mode. In the parallel mode, the transceiver 200 transmits 4×25 Gb/s optical signals generated by the four TLs 240 and modulated by the external modulators 242 over four parallel optical channels and receives 4×25 Gb/s optical signals at the PIN photodiodes 280 over four parallel optical channels, and the transceiver 300 transmits 4×25 Gb/s optical signals generated by the four TLs 340 and modulated by the external modulators 342 over four parallel optical channels and receives 4×25 Gb/s optical signals at the PIN photodiodes 380 over four parallel optical channels.

In a case where a set of transceivers 200/300 that are fabricated without their 16/40 WDM elements and their optional SOAs and are operated in the parallel mode is used in the transceiver 100, the demultiplexers 135 in the OTRIN 130 and the multiplexers 155 in the ORCVIN 150 are not used and are preferably not fabricated, and the transmitters 205/305 of the set of transceivers 200/300 are coupled directly to the multiplexer 140, and the receivers 210/310 of the set of transceivers 200/300 are coupled directly to the demultiplexer 160. In a case where a set of transceivers 200/300 that are fabricated without their 16/40 WDM elements and their optional SOAs and are operated in the parallel mode interface with the optical transceiver interface 400, the demultiplexers 415 in the OTRIN 405 and the multiplexers 425 in the ORCVIN 410 are not used and are preferably not fabricated, and the multiplexer 420 and the demultiplexer 430 are directly coupled to the CO equipment.

Figure 5:
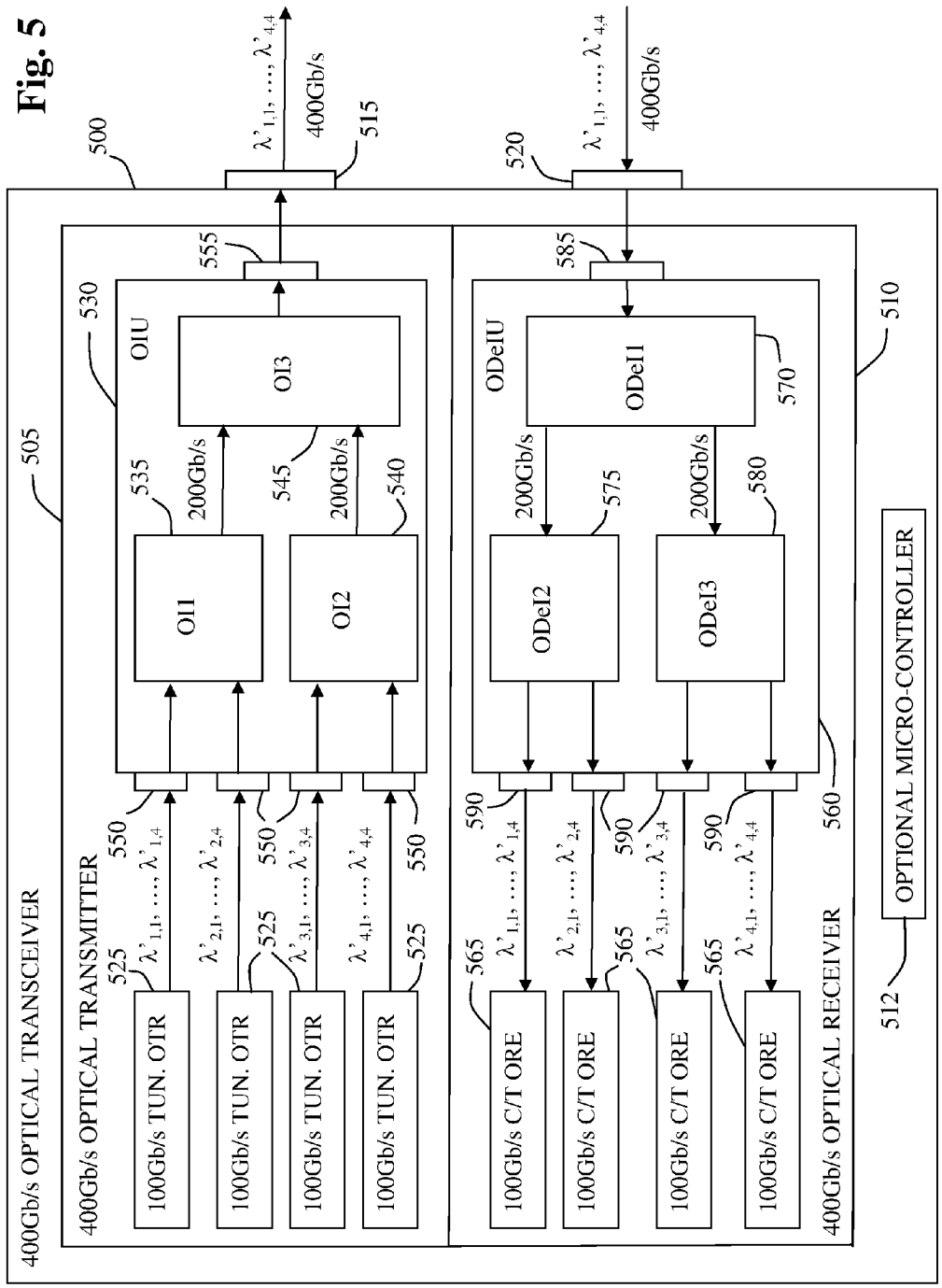
FIG. 5 is a simplified block diagram illustration of a substantially 400 Gb/s optical transceiver constructed and operative in accordance with another embodiment of the present invention.

Reference is now made to FIG. 5, which is a simplified block diagram illustration of a substantially 400 Gb/s optical transceiver constructed and operative in accordance with another embodiment of the present invention.

The substantially 400 Gb/s optical transceiver of FIG. 5, which is generally designated 500, includes a substantially 400 Gb/s optical transmitter 505, a substantially 400 Gb/s optical receiver 510, and optionally a micro-controller 512 or any other appropriate controller. The optical transmitter 505 is operative to transmit substantially 400 Gb/s optical signals, typically at wavelengths in the C-band or in the L-band and the optical receiver 510 is operative to receive substantially 400 Gb/s optical signals, typically at wavelengths corresponding to the wavelengths used by the optical transmitter 505.

The controller 512, if included, may control channel wavelength tuning in the optical transmitter 505 and the optical receiver 510 by controlling components associated with the optical transmitter 505 and the optical receiver 510, respectively, as described herein below, and may also be operative to identify and report faults, such as thermal deviation faults, and may perform transceiver control and management operations, such as operations related to thermal control and management.

The optical transmitter 505 may transmit the substantially 400 Gb/s optical signals via a port 515 which is comprised in or associated with the optical transceiver 500, and the optical receiver 510 may receive the substantially 400 Gb/s optical signals via a port 520 which is comprised in or associated with the optical transceiver 500. Each of the ports 515 and 520 may typically be associated with an optical fiber (not shown) over which the substantially 400 Gb/s optical signals are transmitted and received, respectively.

The optical transmitter 505 includes a set of four substantially 100 Gb/s tunable optical transmitters 525 and an optical interleaving unit (OIU) 530. Each of the substantially 100 Gb/s tunable optical transmitters 525 is similar in structure and functionality to the transmitter 205 of FIG. 2 or the transmitter 305 of FIG. 3 operating at wavelengths in the C-band or in the L-band. Each of the substantially 100 Gb/s tunable optical transmitters 525 is operative to transmit a substantially 100 Gb/s optical signal in a wavelength division multiplexed form using four channel wavelengths in the C-band or in the L-band, each carrying substantially 25 Gb/s optical signals. Each of the substantially 100 Gb/s tunable optical transmitters 525 is tunable to one or more sets of wavelengths that are usable for interleaving.

Throughout the present specification and claims, wavelengths are referred to as "usable for interleaving" when the lowest channel spacing between the wavelengths is appropriate for interleaving (de-interleaving) by an optical interleaver (de-interleaver), in which case optical signals carried over those of the wavelengths that are arranged as odd wavelengths can be interleaved with optical signals carried over those of the wavelengths that are arranged as even wavelengths and vice versa, and optical signals carried over the wavelengths can be de-interleaved to produce optical signals over odd wavelengths and optical signals over even wavelengths. It is appreciated that the wavelengths that are usable for interleaving may or may not be in any of the ITU specified transmission bands.

The OIU 530 is operatively associated with the four substantially 100 Gb/s tunable optical transmitters 525 and is operative to interleave substantially 100 Gb/s optical signals received from the four optical transmitters 525 to generate a substantially 400 Gb/s optical signal for transmission.

In the embodiment of FIG. 5 the OIU 530 includes a cascaded set of optical interleavers (OIs) comprising a first OI 535, a second OI 540, and a third OI 545. The OIU 530 may further include, or be associated with, four receiving ports 550 and one transmission port 555. The OIU 530 may receive the substantially 100 Gb/s optical signals from the four optical transmitters 525 via the ports 550, and transmit the generated substantially 400 Gb/s optical signal via the port 555.

The first OI 535 is operatively associated with two of the four optical transmitters 525 and with the third OI 545 and is operative to interleave the substantially 100 Gb/s optical signals from the two of the four optical transmitters 525 to generate a first substantially 200 Gb/s interleaved optical signal. The second OI 540 is operatively associated with the other two of the four optical transmitters 525 and with the third OI 545 and is operative to interleave the substantially 100 Gb/s optical signals from the other two of the four optical transmitters 525 to generate a second substantially 200 Gb/s interleaved optical signal.

The third OI 545 is operative to interleave the first substantially 200 Gb/s interleaved optical signal and the second substantially 200 Gb/s interleaved optical signal to generate the substantially 400 Gb/s optical signal, which is then transmitted via the ports 555 and 515.

The optical receiver 510 includes an optical de-interleaving unit (ODeIU) 560 and a set of four substantially 100 Gb/s colorless or tunable (C/T) optical receivers 565. Each of the substantially 100 Gb/s C/T optical receivers 565 is similar in structure and functionality to the receiver 210 of FIG. 2 or the receiver 310 of FIG. 3 operating at wavelengths in the C-band or in the L-band. Each of the substantially 100 Gb/s C/T optical receivers 565 is operative to receive a substantially 100 Gb/s optical signal provided in a wavelength division multiplexed form using four channel wavelengths in the C-band or in the L-band, each carrying substantially 25 Gb/s optical signals. The channel wavelengths used by the substantially 100 Gb/s C/T optical receivers 565 typically correspond to the channel wavelengths used by the substantially 100 Gb/s tunable optical transmitters 525.

The ODeIU 560 is operative to de-interleave a substantially 400 Gb/s optical signal received at the optical receiver 510 to produce four substantially 100 Gb/s de-interleaved optical signals. The four substantially 100 Gb/s C/T optical receivers 565 are operatively associated with the ODeIU 560 and are operative to respectively receive the four substantially 100 Gb/s de-interleaved optical signals.

In the embodiment of FIG. 5 the ODeIU 560 includes a cascaded set of optical de-interleavers (ODeIs) comprising a first ODeI 570, a second ODeI 575, and a third ODeI 580. The ODeIU 560 may further include, or be associated with, one receiving port 585 and four transmission ports 590. The ODeIU 560 may receive the substantially 400 Gb/s optical signal via the port 585 and provide the four substantially 100 Gb/s de-interleaved optical signals to the four substantially 100 Gb/s C/T optical receivers 565 via the ports 590.

The first ODeI 570 is operative to de-interleave the received substantially 400 Gb/s optical signal to produce a first substantially 200 Gb/s de-interleaved optical signal and a second substantially 200 Gb/s de-interleaved optical signal. The second ODeI 575 is operatively associated with the first ODeI 570 and with two of the four substantially 100 Gb/s C/T optical receivers 565 and is operative to de-interleave the first substantially 200 Gb/s de-interleaved optical signal to produce two of the four substantially 100 Gb/s de-interleaved optical signals, and to provide the two of the four substantially 100 Gb/s de-interleaved optical signals to the two of the four substantially 100 Gb/s C/T optical receivers 565 for reception thereby. The third ODeI 580 is operatively associated with the first ODeI 570 and with the other two of the four substantially 100 Gb/s C/T optical receivers 565 and is operative to de-interleave the second substantially 200 Gb/s de-interleaved optical signal to produce the other two of the four substantially 100 Gb/s de-interleaved optical signals, and to provide the other two of the four substantially 100 Gb/s de-interleaved optical signals to the other two of the four substantially 100 Gb/s C/T optical receivers 565 for reception thereby.

The optical interleavers 535, 540 and 545 and the optical de-interleavers 570, 575 and 580 may include conventional optical interleavers and de-interleavers which are usable in the C-band and/or the L-band, such as standard optical interleavers that are commercially available from Optoplex Corporation of Fremont, Calif., USA and may be used either as interleavers or de-interleavers.

In one embodiment, the cascaded set of optical interleavers of the OIU 530 may alternatively be implemented by a single dual-stage optical interleaver, and the cascaded set of optical de-interleavers of the ODeIU 560 may alternatively be implemented by a single dual-stage optical de-interleaver.

In transmission operation, each substantially 100 Gb/s tunable optical transmitter 525 is tuned so as to use a set of four wavelengths which are different from wavelengths used by another substantially 100 Gb/s tunable optical transmitter 525, and so that the wavelengths used by the four optical transmitters 525 are usable for interleaving.

In FIG. 5 the different wavelengths usable for interleaving that are used by the optical transmitters 525 and the optical receivers 565 are designated $\lambda'_{1,1}, \ldots, \lambda'_{1,4}, \lambda'_{2,1} \ldots, \lambda'_{2,4}, \lambda'_{3,1} \ldots, \lambda'_{3,4}$ and $\lambda'_{4,1} \ldots, \lambda'_{4,4}$.

Tuning to the sets of different wavelengths that are usable for interleaving may be automatically performed in response to instructions provided by controllers (not shown in FIG. 5) associated with the transmitters 525 and the receivers 565, each such controller being either the micro-controller 215 of FIG. 2 or the micro-controller 315 of FIG. 3, or by the controller 512 if included, or by the controller 512 operating in conjunction with the controllers associated with the transmitters 525 and the receivers 565.

The substantially 100 Gb/s optical signals transmitted by the substantially 100 Gb/s tunable optical transmitters 525 are interleaved to generate a substantially 400 Gb/s optical signal. In one embodiment, interleaving to generate the substantially 400 Gb/s optical signal may be cascaded, for example as follows: the substantially 100 Gb/s optical signals from two of the four optical transmitters 525 that use the wavelengths $\lambda'_{1,1}, \ldots, \lambda'_{1,4}$ and $\lambda'_{2,1} \ldots, \lambda'_{2,4}$ are interleaved by the OI 535 to generate a first substantially 200 Gb/s interleaved optical signal in a wavelength division multiplexed form using the eight wavelengths $\lambda'_{1,1}, \ldots, \lambda'_{1,4}, \lambda'_{2,1} \ldots, \lambda'_{2,4}$, each carrying substantially 25 Gb/s optical signals. The substantially 100 Gb/s optical signals from the other two of the four optical transmitters 525 that use the wavelengths $\lambda'_{3,1} \ldots, \lambda'_{3,4}$ and $\lambda'_{4,1} \ldots, \lambda'_{4,4}$ are interleaved by the OI 540 to generate a second substantially 200 Gb/s interleaved optical signal in a wavelength division multiplexed form using the eight wavelengths $\lambda'_{3,1} \ldots, \lambda'_{3,4}, \lambda'_{4,1} \ldots, \lambda'_{4,4}$, each carrying substantially 25 Gb/s optical signals. Then, the first substantially 200 Gb/s interleaved optical signal and the second substantially 200 Gb/s interleaved optical signal are interleaved by the OI 545 to generate a substantially 400 Gb/s optical signal in a wavelength division multiplexed form using the sixteen wavelengths $\lambda'_{1,1}, \ldots, \lambda'_{1,4}, \lambda'_{2,1} \ldots, \lambda'_{2,4}, \lambda'_{3,1} \ldots, \lambda'_{3,4}, \lambda'_{4,1} \ldots, \lambda'_{4,4}$, each carrying substantially 25 Gb/s optical signals.

By way of a non-limiting example, starting with the substantially 100 Gb/s optical signals having a symmetric 400 GHz channel spacing, the optical interleavers 535 and 540 being 200-400 GHz optical interleavers, and the optical interleaver 545 being a 100-200 GHz optical interleaver results in each of the first substantially 200 Gb/s interleaved optical signal and the second substantially 200 Gb/s interleaved optical signal having a 200 GHz channel spacing, and the substantially 400 Gb/s optical signal having a 100 GHz channel spacing.

In reception operation, a substantially 400 Gb/s optical signal in a wavelength division multiplexed form using the sixteen wavelengths $\lambda'_{1,1}, \ldots, \lambda'_{1,4}, \lambda'_{2,1} \ldots, \lambda'_{2,4}, \lambda'_{3,1} \ldots, \lambda'_{3,4}, \lambda'_{4,1} \ldots, \lambda'_{4,4}$, each carrying substantially 25 Gb/s optical signals is received via the port 520. The 400 Gb/s optical signal is de-interleaved by the ODeIU 560 to produce four substantially 100 Gb/s de-interleaved optical signals that are provided to and received by the four substantially 100 Gb/s C/T optical receivers 565. In one embodiment, de-interleaving to produce the substantially 100 Gb/s de-interleaved optical signals may be cascaded, for example as follows: the substantially 400 Gb/s optical signal is de-interleaved by the first ODeI 570 to produce a first substantially 200 Gb/s de-interleaved optical signal in a wavelength division multiplexed form using the eight wavelengths $\lambda'_{1,1}, \ldots, \lambda'_{2,1} \ldots, \lambda'_{2,4}$, each carrying substantially 25 Gb/s optical signals, and a second substantially 200 Gb/s de-interleaved optical signal in a wavelength division multiplexed form using the eight wavelengths $\lambda'_{3,1} \ldots, \lambda'_{3,4}, \lambda'_{4,1} \ldots, \lambda'_{4,4}$, each carrying substantially 25 Gb/s optical signals. The first substantially 200 Gb/s de-interleaved optical signal is de-interleaved by the second ODeI 575 to produce a substantially 100 Gb/s de-interleaved optical signal in a wavelength division multiplexed form using the four wavelengths $\lambda'_{1,1}, \ldots, \lambda'_{1,4}$ and a substantially 100 Gb/s de-interleaved optical signal in a wavelength division multiplexed form using the four wavelengths $\lambda'_{2,1} \ldots, \lambda'_{2,4}$. The second substantially 200 Gb/s de-interleaved optical signal is de-interleaved by the third ODeI 580 to produce a substantially 100 Gb/s de-interleaved optical signal in a wavelength division multiplexed form using the four wavelengths $\lambda'_{3,1}, \ldots, \lambda'_{3,4}$ and a substantially 100 Gb/s de-interleaved optical signal in a wavelength division multiplexed form using the four wavelengths $\lambda'_{4,1} \ldots, \lambda'_{4,4}$. The four substantially 100 Gb/s de-interleaved optical signals are provided to the four substantially 100 Gb/s C/T optical receivers 565, respectively. Each of the optical receivers 565 is capable of using the four wavelengths of a substantially 100 Gb/s de-interleaved optical signal received thereat or is tuned to use the four wavelengths of the substantially 100 Gb/s de-interleaved optical signal received thereat.

Tuning to the channel wavelengths used by the four substantially 100 Gb/s C/T optical receivers 565 may be automatically performed in response to instructions provided by the controllers associated with the transmitters 525 and the receivers 565, or by the controller 512 if included, or by the controller 512 operating in conjunction with the controllers associated with the transmitters 525 and the receivers 565. The two of the four substantially 100 Gb/s C/T optical receivers 565 with which the second ODeI 575 is operatively associated are tuned to two sets of four channel wavelengths used by the second ODeI 575, respectively, and the other two of the four substantially 100 Gb/s C/T optical receivers 565 with which the third ODeI 580 is operatively associated are tuned to two sets of four channel wavelengths used by the third ODeI 580, respectively.

By way of a non-limiting example, starting with the substantially 400 Gb/s optical signal having a symmetric 100 GHz channel spacing, the optical de-interleaver 570 being a 100-200 GHz optical de-interleaver, and the optical de-interleavers 575 and 580 being 200-400 GHz optical de-interleavers results in each of the first substantially 200 Gb/s de-interleaved optical signal and the second substantially 200 Gb/s de-interleaved optical signal having a 200 GHz channel spacing, and each of the substantially 100 Gb/s de-interleaved optical signals having a 400 GHz channel spacing.

It is noted that in the embodiment of FIG. 5 the OIU 530 converts four substantially 100 Gb/s optical signals received from the set of four substantially 100 Gb/s tunable optical transmitters 525 into a substantially 400 Gb/s optical signal for transmission, and the ODeIU 560 converts a substantially 400 Gb/s optical signal into four substantially 100 Gb/s optical signals for reception by the set of four substantially 100 Gb/s C/T optical receivers 565.

It is appreciated that the substantially 400 Gb/s optical transceiver 500 is not limited to operation in the C-band or the L-band, and may alternatively operate in one of the O, E and S bands in cases where the OIU 530, the ODeIU 560, the optical transmitters 525, and the optical receivers 565 are operable at a corresponding one of the O, E and S bands.

Figure 6:
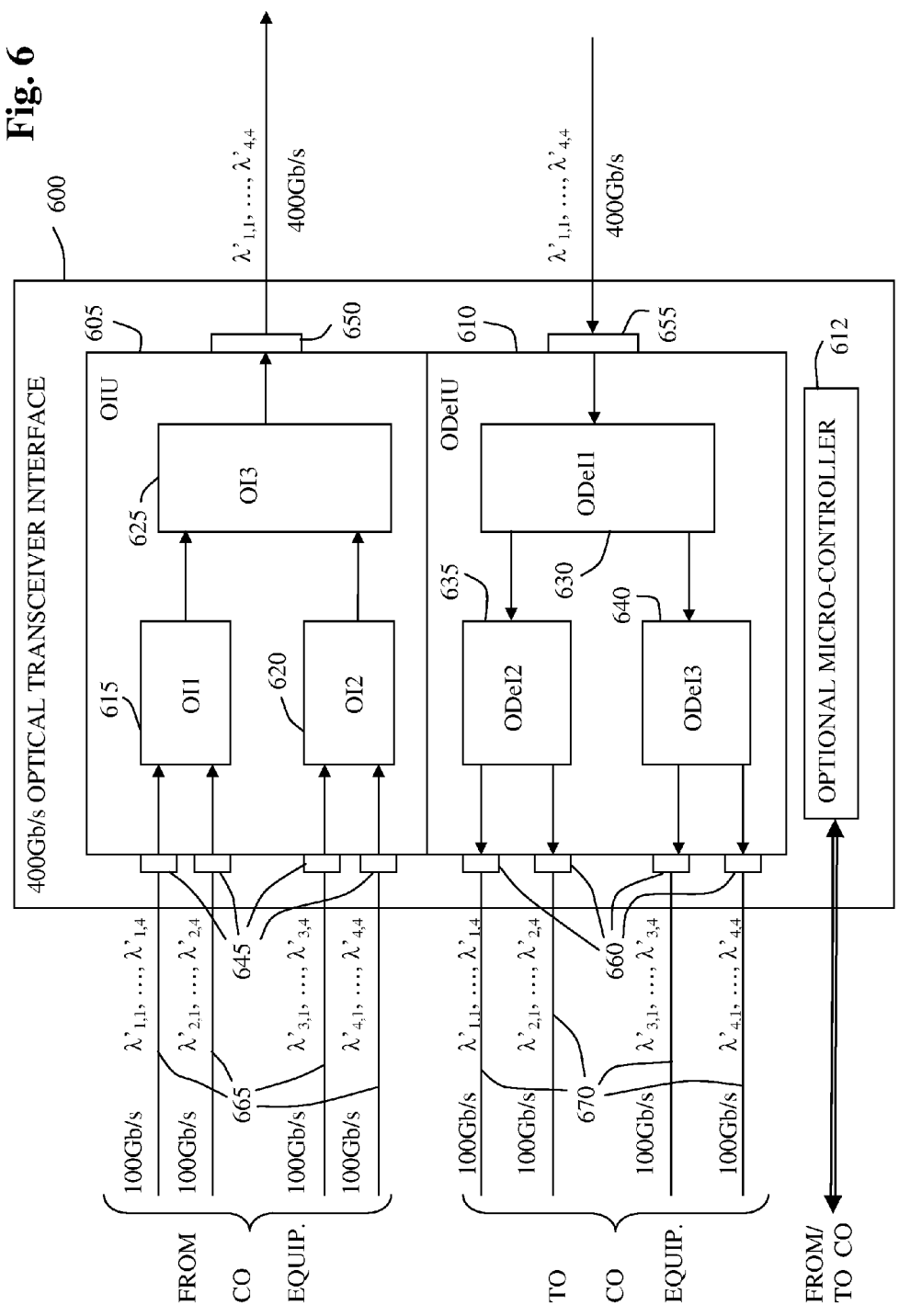
FIG. 6 is a simplified block diagram illustration of a substantially 400 Gb/s optical transceiver interface constructed and operative in accordance with another embodiment of the present invention.

Reference is now additionally made to FIG. 6, which is a simplified block diagram illustration of a substantially 400 Gb/s optical transceiver interface constructed and operative in accordance with another embodiment of the present invention.

The substantially 400 Gbs optical transceiver interface of FIG. 6, which is generally designated 600, includes an OIU 605, an ODeIU 610, and optionally a micro-controller 612 or any other appropriate controller. The OIU 605 is similar in structure and functionality to the OIU 530, and includes a cascaded set of optical interleavers comprising a first OI 615, a second OI 620, and a third OI 625 which are similar in structure and functionality to the OI 535, the OI 540, and the OI 545, respectively. The ODeIU 610 is similar in structure and functionality to the ODeIU 560, and includes a cascaded set of optical de-interleavers comprising a first ODeI 630, a second ODeI 635, and a third ODeI 640 which are similar in structure and functionality to the ODeI 570, the ODeI 575, and the ODeI 580, respectively. The micro-controller 612 is similar in structure and functionality to the micro-controller 512.

In one embodiment, the cascaded set of optical interleavers of the OIU 605 may alternatively be implemented by a single dual-stage optical interleaver, and the cascaded set of optical de-interleavers of the ODeIU 610 may alternatively be implemented by a single dual-stage optical de-interleaver.

The OIU 605 may further include, or be associated with four receiving ports 645 and one transmission port 650, and the ODeIU 610 may further include, or be associated with one receiving port 655 and four transmission ports 660. The optical transceiver interface 600 may receive substantially 100 Gb/s optical signals from CO equipment (not shown) via the ports 645 and transmit a substantially 400 Gbs optical signal via the port 650, and may receive a substantially 400 Gb/s optical signal via the port 655 and transmit substantially 100 Gbs optical signals to the CO equipment via the ports 660.

The substantially 100 Gb/s optical signals received from the CO equipment are received over optical fibers 665, each carrying a respective one of the received substantially 100 Gb/s optical signals in a form of a 4×25 Gb/s wavelength division multiplexed optical signal carried over a set of four channel wavelengths, and the channel wavelengths used over the optical fibers 665 are different from each other. The substantially 100 Gb/s optical signals transmitted to the CO equipment are transmitted over optical fibers 670, each carrying a respective one of the transmitted substantially 100 Gb/s optical signals in a form of 4×25 Gb/s wavelength division multiplexed optical signal carried over a set of four channel wavelengths, and the channel wavelengths used over the optical fibers 670 are different from each other and typically correspond to the channel wavelengths used over the optical fibers 665. The substantially 400 Gbs optical signal transmitted by or received by the optical transceiver interface 600 is in a form of 16×25 Gb/s wavelength division multiplexed optical signal, wherein the 16 channel wavelengths are different from each other.

The CO equipment may be similar to the CO equipment mentioned above with respect to the optical transceiver interface 400 of FIG. 4 and may similarly operate to switch or route substantially 100 Gb/s optical signals either for stand-alone communication at substantially 100 Gb/s or for communication at 200 Gb/s, such as at 400 Gb/s. In a case where the CO equipment switches or routes the substantially 100 Gb/s optical signals for communication at 400 Gb/s, the CO equipment transmits four substantially 100 Gb/s optical signals to the OIU 605 over the optical fibers 665, and the OIU 605 operates similarly to the OIU 530 to convert the four substantially 100 Gb/s optical signals into a substantially 400 Gb/s optical signal for transmission via the port 650. The ODeIU 610 operates similarly to the ODeIU 560 to receive a substantially 400 Gb/s optical signal via the port 655 and to convert the substantially 400 Gb/s optical signal into four substantially 100 Gb/s optical signals for transmission to the CO equipment over the optical fibers 670.

Figure 7:
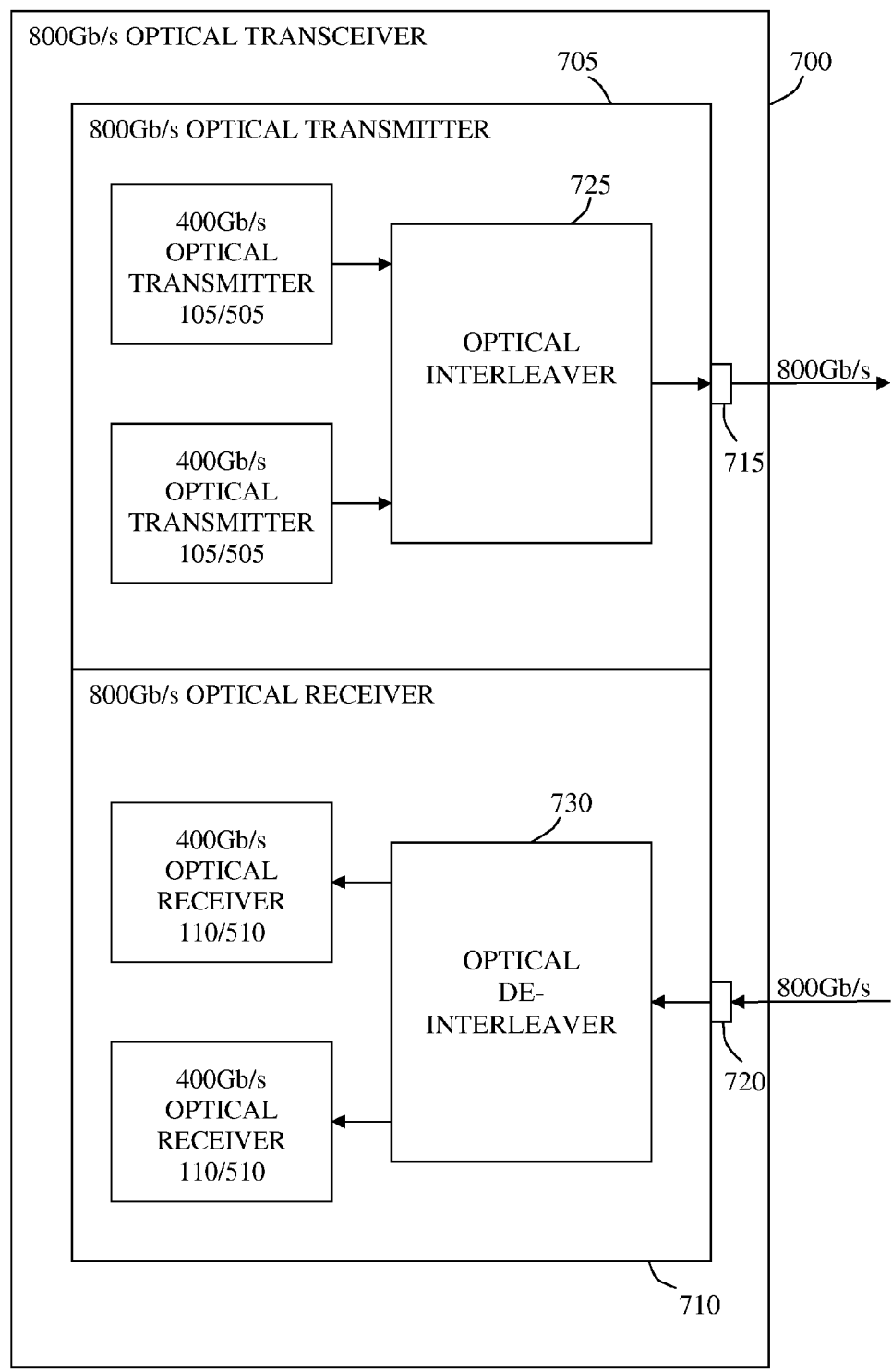
FIG. 7 is a simplified block diagram illustration of a substantially 800 Gb/s optical transceiver constructed and operative in accordance with an embodiment of the present invention.

Reference is now additionally made to FIG. 7, which is a simplified block diagram illustration of a substantially 800 Gb/s optical transceiver constructed and operative in accordance with an embodiment of the present invention.

The substantially 800 Gb/s optical transceiver of FIG. 7, which is generally designated 700, includes a substantially 800 Gb/s optical transmitter 705 and a substantially 800 Gb/s optical receiver 710. The optical transmitter 705 is operative to transmit substantially 800 Gb/s optical signals, typically at wavelengths in the C-band or the L-band and the optical receiver 710 is operative to receive substantially 800 Gb/s optical signals, typically at wavelengths corresponding to the wavelengths used by the optical transmitter 705. The optical transmitter 705 may transmit the substantially 800 Gb/s optical signals via a port 715 which is comprised in or associated with the optical transceiver 700, and the optical receiver 710 may receive the substantially 800 Gb/s optical signals via a port 720 which is comprised in or associated with the optical transceiver 700. Each of the ports 715 and 720 may typically be associated with an optical fiber (not shown) over which the substantially 800 Gb/s optical signals are transmitted and received, respectively.

The optical transmitter 705 includes two substantially 400 Gb/s optical transmitters 105 as described above with reference to FIG. 1 or two substantially 400 Gb/s optical transmitters 505 as described above with reference to FIG. 5, or a combination of one optical transmitter 105 and one optical transmitter 505, wherein each of the substantially 400 Gb/s optical transmitters 105/505 typically operates at wavelengths in the C-band or the L-band that are usable for interleaving. The optical transmitter 705 further includes an optical interleaver 725 which is operatively associated with the two substantially 400 Gb/s optical transmitters 105/505.

The optical receiver 710 includes two substantially 400 Gb/s optical receivers 110 as described above with reference to FIG. 1 or two substantially 400 Gb/s optical receivers 510 as described above with reference to FIG. 5, or a combination of one optical receiver 110 and one optical receiver 510, wherein each of the substantially 400 Gb/s optical receivers 110/510 operates at wavelengths that are usable for interleaving. The optical receiver 710 further includes an optical de-interleaver 730 which is operatively associated with the two substantially 400 Gb/s optical receivers 110/510.

The two substantially 400 Gb/s optical transmitters 105/505 and the two substantially 400 Gb/s optical receivers 110/510 form two substantially 400 Gb/s optical transceivers, and therefore the substantially 800 Gb/s optical transceiver 700 may be viewed as including two substantially 400 Gb/s optical transceivers, the optical interleaver 725, and the optical de-interleaver 730, wherein the optical interleaver 725 is operatively associated with the two substantially 400 Gb/s optical transmitters 105/505 of the two substantially 400 Gb/s optical transceivers and the optical de-interleaver 730 is operatively associated with the two substantially 400 Gb/s optical receivers 110/510 of the two substantially 400 Gb/s optical transceivers.

In transmission operation, the optical interleaver 725 interleaves a substantially 400 Gb/s optical signal received from one of the two substantially 400 Gb/s optical transmitters 105/505 over odd channel wavelengths with a substantially 400 Gb/s optical signal received from the other one of the two substantially 400 Gb/s optical transmitters 105/505 over even channel wavelengths to generate a substantially 800 Gb/s optical signal for transmission via the port 715. In reception operation, a substantially 800 Gb/s optical signal is received via the port 720, and de-interleaved by the optical de-interleaver 730 to produce a substantially 400 Gb/s de-interleaved optical signal over odd channel wavelengths which is provided to and received by one of the two substantially 400 Gb/s optical receivers 110/510, and a substantially 400 Gb/s de-interleaved optical signal over even channel wavelengths which is provided to and received by the other one of the two substantially 400 Gb/s optical receivers 110/510.

By way of a non-limiting example, starting with the substantially 400 Gb/s optical signals from the two substantially 400 Gb/s optical transmitters 105/505 having a symmetric 100 GHz channel spacing and the optical interleaver 725 being a 50-100 GHz optical interleaver results in the substantially 800 Gb/s optical signal transmitted by the optical transmitter 705 having a 50 GHz channel spacing, and starting with the substantially 800 Gb/s optical signal received via the port 720 having a symmetric 50 GHz channel spacing and the optical de-interleaver 730 being a 50-100 GHz optical de-interleaver results in each of the two substantially 400 Gb/s de-interleaved optical signals having a 100 GHz channel spacing.

It is appreciated that the substantially 800 Gb/s optical transceiver 700 is not limited to operation in the C-band or the L-band, and may alternatively operate in one of the O, E and S bands in cases where the substantially 400 Gb/s optical transmitters 105/505, the substantially 400 Gb/s optical receivers 110/510, the optical interleaver 725, and the optical de-interleaver 730 are operable at a corresponding one of the O, E and S bands.

Figure 8:
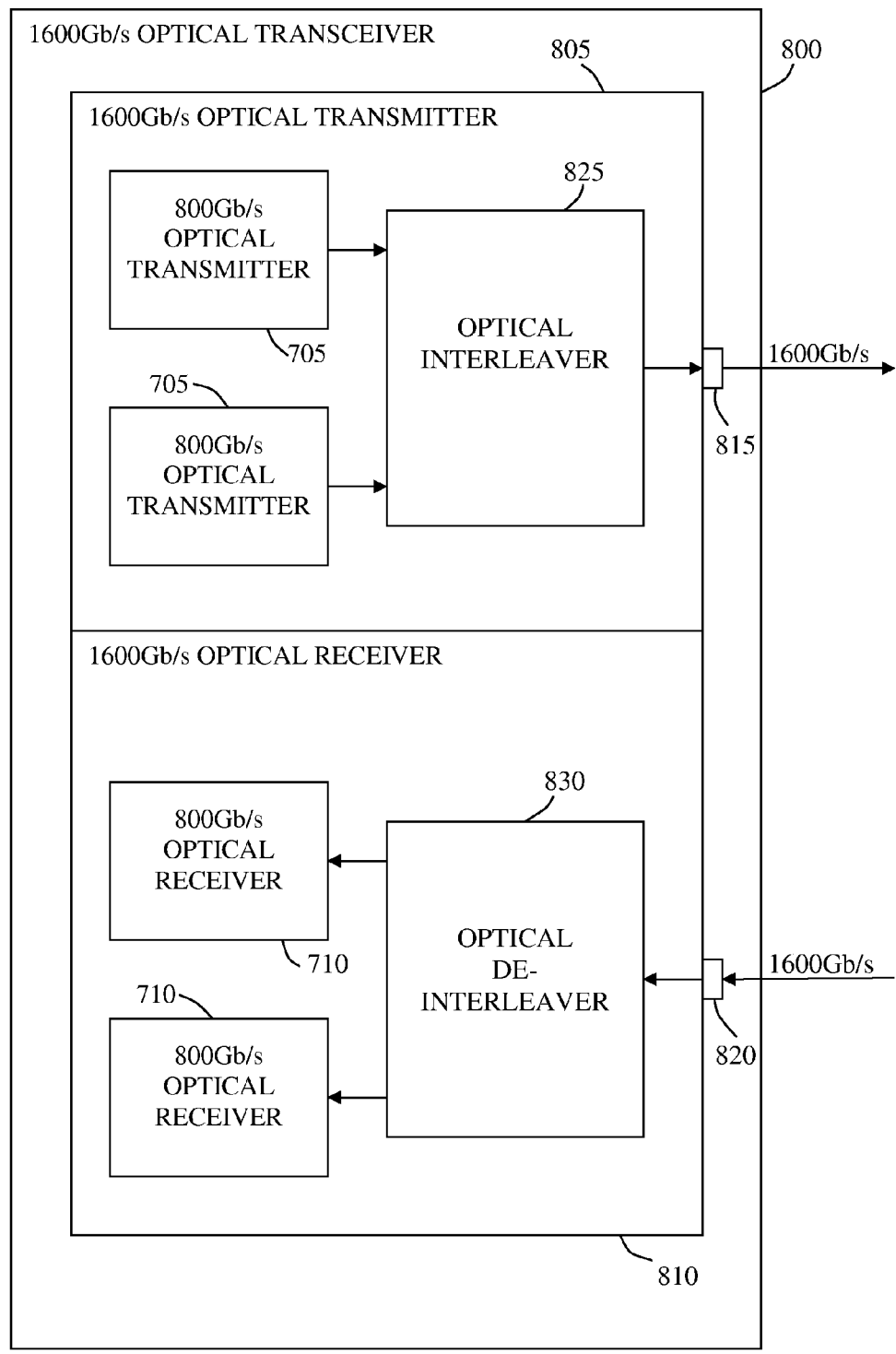
FIG. 8 is a simplified block diagram illustration of a substantially 1600 Gb/s optical transceiver constructed and operative in accordance with an embodiment of the present invention.

Reference is now additionally made to FIG. 8, which is a simplified block diagram illustration of a substantially 1600 Gb/s optical transceiver constructed and operative in accordance with an embodiment of the present invention.

The substantially 1600 Gb/s optical transceiver of FIG. 8, which is generally designated 800, includes a substantially 1600 Gb/s optical transmitter 805 and a substantially 1600 Gb/s optical receiver 810. The optical transmitter 805 is operative to transmit substantially 1600 Gb/s optical signals, typically at wavelengths in the C-band or the L-band and the optical receiver 810 is operative to receive substantially 1600 Gb/s optical signals, typically at wavelengths corresponding to the wavelengths used by the optical transmitter 805. The optical transmitter 805 may transmit the substantially 1600 Gb/s optical signals via a port 815 which is comprised in or associated with the optical transceiver 800, and the optical receiver 810 may receive the substantially 1600 Gb/s optical signals via a port 820 which is comprised in or associated with the optical transceiver 800. Each of the ports 815 and 820 may typically be associated with an optical fiber (not shown) over which the substantially 1600 Gb/s optical signals are transmitted and received, respectively.

The optical transmitter 805 includes two substantially 800 Gb/s optical transmitters 705 as described above with reference to FIG. 7, wherein each of the substantially 800 Gb/s optical transmitters 705 typically operates at wavelengths in the C-band or the L-band that are usable for interleaving. The optical transmitter 805 further includes an optical interleaver 825 which is operatively associated with the two substantially 800 Gb/s optical transmitters 705.

The optical receiver 810 includes two substantially 800 Gb/s optical receivers 710 as described above with reference to FIG. 7, wherein each of the substantially 800 Gb/s optical receivers 710 operates at wavelengths that are usable for interleaving. The optical receiver 810 further includes an optical de-interleaver 830 which is operatively associated with the two substantially 800 Gb/s optical receivers 710.

The two substantially 800 Gb/s optical transmitters 705 and the two substantially 800 Gb/s optical receivers 710 form two substantially 800 Gb/s optical transceivers, and therefore the substantially 1600 Gb/s optical transceiver 800 may be viewed as including two substantially 800 Gb/s optical transceivers, the optical interleaver 825, and the optical de-interleaver 830, wherein the optical interleaver 825 is operatively associated with the two substantially 800 Gb/s optical transmitters 705 of the two substantially 800 Gb/s optical transceivers and the optical de-interleaver 830 is operatively associated with the two substantially 800 Gb/s optical receivers 710 of the two substantially 800 Gb/s optical transceivers.

In transmission operation, the optical interleaver 825 interleaves a substantially 800 Gb/s optical signal received from one of the two substantially 800 Gb/s optical transmitters 705 over odd channel wavelengths with a substantially 800 Gb/s optical signal received from the other one of the two substantially 800 Gb/s optical transmitters 705 over even channel wavelengths to generate a substantially 1600 Gb/s optical signal for transmission via the port 815. In reception operation, a substantially 1600 Gb/s optical signal is received via the port 820, and de-interleaved by the optical de-interleaver 830 to produce a substantially 800 Gb/s de-interleaved optical signal over odd channel wavelengths which is provided to and received by one of the two substantially 800 Gb/s optical receivers 710, and a substantially 800 Gb/s de-interleaved optical signal over even channel wavelengths which is provided to and received by the other one of the two substantially 800 Gb/s optical receivers 710.

By way of a non-limiting example, starting with the substantially 800 Gb/s optical signals from the two substantially 800 Gb/s optical transmitters 705 having a symmetric 50 GHz channel spacing and the optical interleaver 825 being a 25-50 GHz optical interleaver results in the substantially 1600 Gb/s optical signal transmitted by the optical transmitter 805 having a 25 GHz channel spacing, and starting with the substantially 1600 Gb/s optical signal received via the port 820 having a symmetric 25 GHz channel spacing and the optical de-interleaver 830 being a 25-50 GHz optical de-interleaver results in each of the two substantially 800 Gb/s de-interleaved optical signals having a 50 GHz channel spacing.

It is appreciated that the substantially 1600 Gb/s optical transceiver 800 is not limited to operation in the C-band or the L-band, and may alternatively operate in one of the O, E and S bands in cases where the substantially 800 Gb/s optical transmitters 705, the substantially 800 Gb/s optical receivers 710, the optical interleaver 825, and the optical de-interleaver 830 are operable at a corresponding one of the O, E and S bands.

Figure 9:
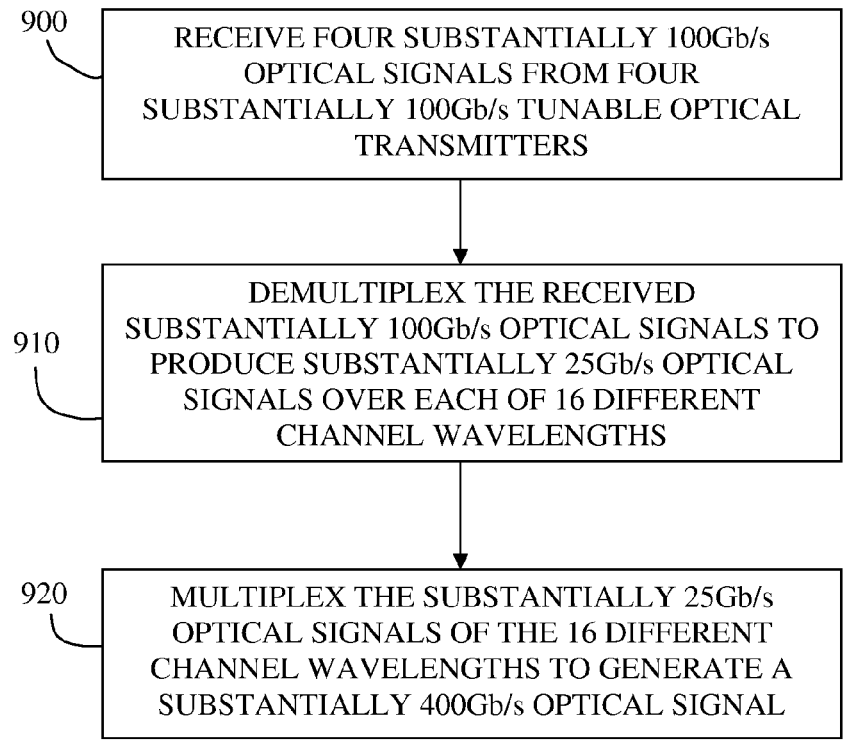
FIG. 9 is a simplified flowchart illustration of a method of generating a substantially 400 Gb/s optical signal for transmission, in accordance with an embodiment of the present invention.

Reference is now made to FIG. 9, which is a simplified flowchart illustration of a method of generating a substantially 400 Gb/s optical signal for transmission, in accordance with an embodiment of the present invention.

Four substantially 100 Gb/s optical signals are received from four substantially 100 Gb/s tunable optical transmitters (step 900). Each of the substantially 100 Gb/s tunable optical transmitters transmits a respective one of the substantially 100 Gb/s optical signals in a wavelength division multiplexed form over four channel wavelengths selected such that the resulting 16 channel wavelengths are different from each other and are suitable for WDM.

The received substantially 100 Gb/s optical signals are demultiplexed to produce substantially 25 Gb/s optical signals over each of the 16 different channel wavelengths (step 910), and the substantially 25 Gb/s optical signals of the 16 different channel wavelengths are multiplexed to generate a substantially 400 Gb/s optical signal (step 920).

Figure 10:
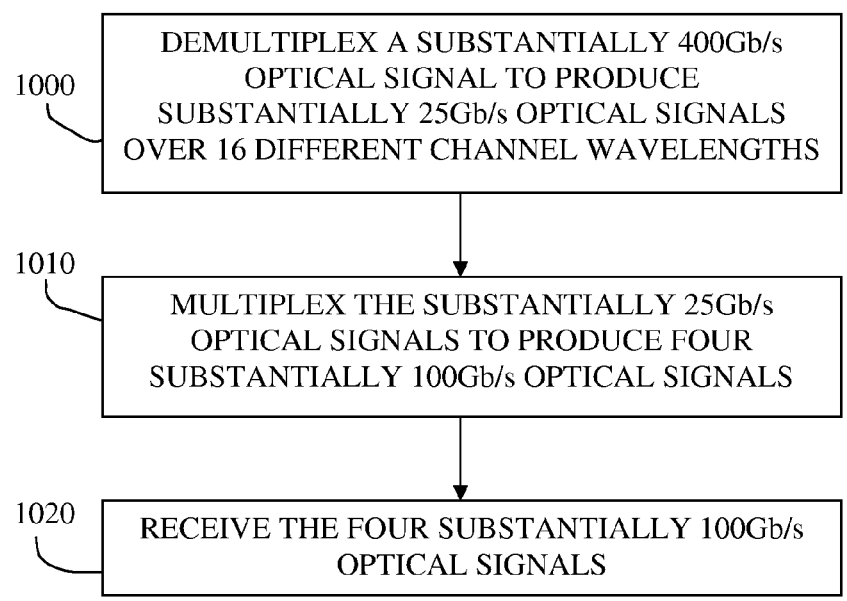
FIG. 10 is a simplified flowchart illustration of a method of receiving a substantially 400 Gb/s optical signal in accordance with an embodiment of the present invention.

Reference is now made to FIG. 10, which is a simplified flowchart illustration of a method of receiving a substantially 400 Gb/s optical signal in accordance with an embodiment of the present invention.

A substantially 400 Gb/s optical signal is demultiplexed to produce substantially 25 Gb/s optical signals over 16 different channel wavelengths (step 1000). The substantially 25 Gb/s optical signals of the 16 different channel wavelengths are multiplexed as four groups of substantially 25 Gb/s optical signals of four different channel wavelengths using WDM to produce four substantially 100 Gb/s optical signals (step 1010), and the resulting four substantially 100 Gb/s optical signals are received (step 1020).

Figure 11:
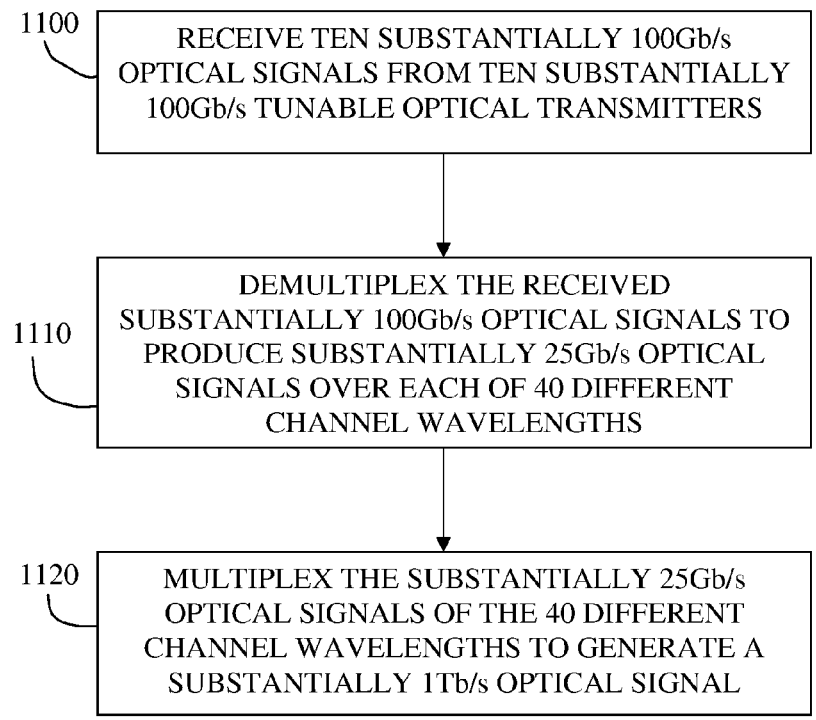
FIG. 11 is a simplified flowchart illustration of a method of generating a substantially 1 Tb/s optical signal for transmission, in accordance with an embodiment of the present invention.

Reference is now made to FIG. 11, which is a simplified flowchart illustration of a method of generating a substantially 1 Tb/s optical signal for transmission, in accordance with an embodiment of the present invention.

Ten substantially 100 Gb/s optical signals are received from ten substantially 100 Gb/s tunable optical transmitters (step 1100). Each of the substantially 100 Gb/s tunable optical transmitters transmits a respective one of the substantially 100 Gb/s optical signals in a wavelength division multiplexed form over four channel wavelengths selected such that the resulting 40 channel wavelengths are different from each other and are suitable for WDM.

The received substantially 100 Gb/s optical signals are demultiplexed to produce substantially 25 Gb/s optical signals over each of the 40 different channel wavelengths (step 1110), and the substantially 25 Gb/s optical signals of the 40 different channel wavelengths are multiplexed to generate a substantially 1 Tb/s optical signal (step 1120).

Figure 12:
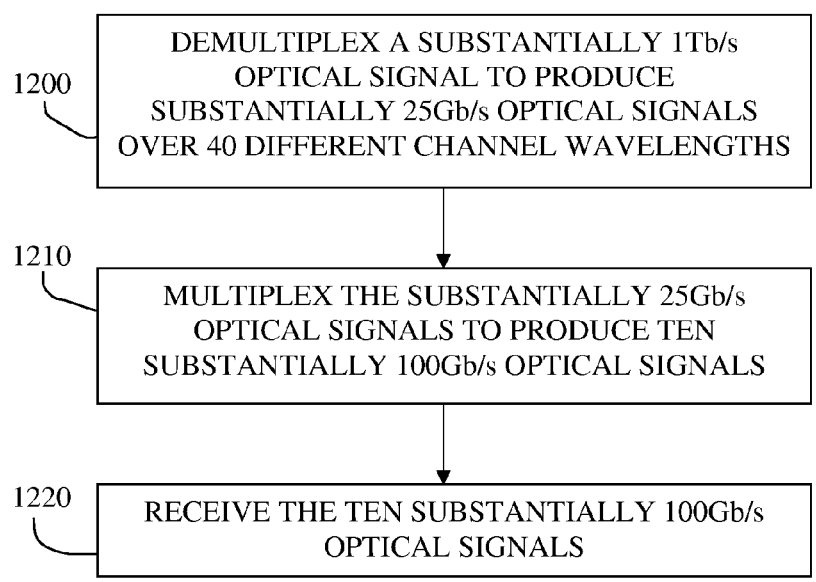
FIG. 12 is a simplified flowchart illustration of a method of receiving a substantially 1 Tb/s optical signal in accordance with an embodiment of the present invention.

Reference is now made to FIG. 12, which is a simplified flowchart illustration of a method of receiving a substantially 1 Tb/s optical signal in accordance with an embodiment of the present invention.

A substantially 1 Tb/s optical signal is demultiplexed to produce substantially 25 Gb/s optical signals over 40 different channel wavelengths (step 1200). The substantially 25 Gb/s optical signals of the 40 different channel wavelengths are multiplexed as ten groups of substantially 25 Gb/s optical signals of four different channel wavelengths using WDM to produce ten substantially 100 Gb/s optical signals (step 1210), and the resulting ten substantially 100 Gb/s optical signals are received (step 1220).

Figure 13:
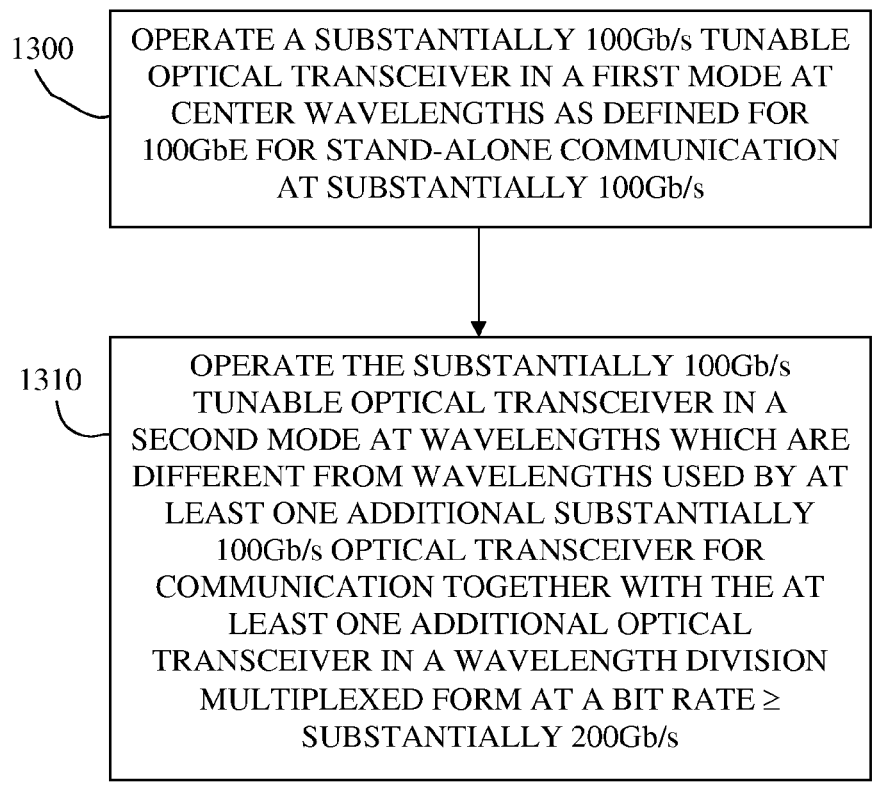
FIG. 13 is a simplified flowchart illustration of a method of operating a substantially 100 Gb/s tunable optical transceiver, in accordance with an embodiment of the present invention.

Reference is now made to FIG. 13, which is a simplified flowchart illustration of a method of operating a substantially 100 Gb/s tunable optical transceiver, in accordance with an embodiment of the present invention;

A substantially 100 Gb/s tunable optical transceiver is operated in a first mode at center wavelengths as defined for 100 GbE for stand-alone communication at substantially 100 Gb/s (step 1300), and is operated in a second mode at wavelengths which are different from wavelengths used by at least one additional substantially 100 Gb/s optical transceiver and which are suitable for WDM therewith for communication together with the at least one additional substantially 100 Gb/s optical transceiver in a wavelength division multiplexed form at a bit rate greater than or equal to substantially 200 Gb/s (step 1310).

Figure 14:
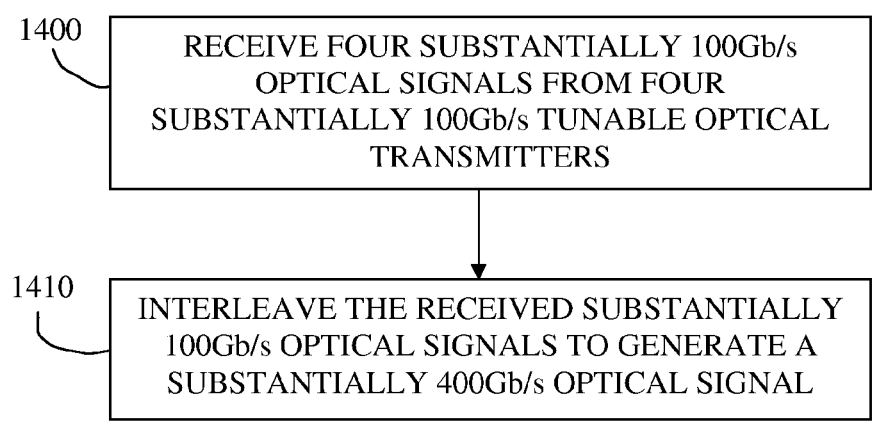
FIG. 14 is a simplified flowchart illustration of a method of generating a substantially 400 Gb/s optical signal for transmission, in accordance with another embodiment of the present invention.

Reference is now made to FIG. 14, which is a simplified flowchart illustration of a method of generating a substantially 400 Gb/s optical signal for transmission, in accordance with another embodiment of the present invention.

Four substantially 100 Gb/s optical signals are received from four substantially 100 Gb/s tunable optical transmitters over wavelengths which are different from each other and are usable for interleaving (step 1400). In one embodiment, each of the received substantially 100 Gb/s optical signals is in a wavelength division multiplexed form over four channel wavelengths selected such that the resulting 16 channel wavelengths are different from each other and are usable for interleaving.

The received substantially 100 Gb/s optical signals are interleaved to generate a substantially 400 Gb/s optical signal (step 1410). In one embodiment, interleaving of the received substantially 100 Gb/s optical signals includes cascadingly interleaving the received substantially 100 Gb/s optical signals to generate the substantially 400 Gb/s optical signal.

Figure 15:
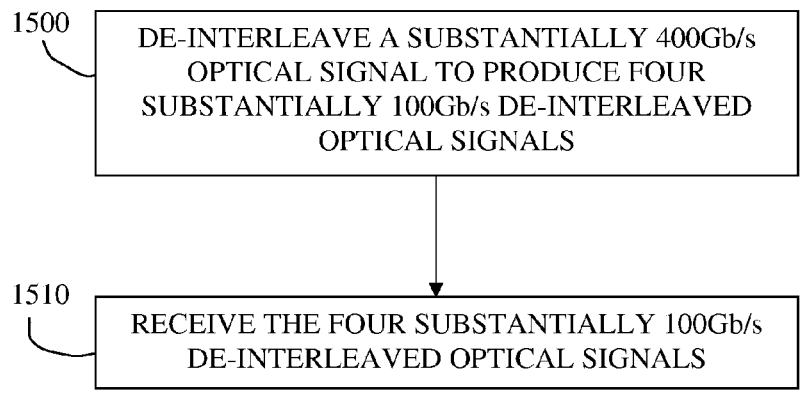
FIG. 15 is a simplified flowchart illustration of a method of receiving a substantially 400 Gb/s optical signal in accordance with another embodiment of the present invention.

Reference is now made to FIG. 15, which is a simplified flowchart illustration of a method of receiving a substantially 400 Gb/s optical signal in accordance with another embodiment of the present invention.

A substantially 400 Gb/s optical signal is de-interleaved to produce four substantially 100 Gb/s de-interleaved optical signals (step 1500), and the four substantially 100 Gb/s de-interleaved optical signals are received (step 1510). In one embodiment, de-interleaving of the substantially 400 Gb/s optical signal includes cascadingly de-interleaving the substantially 400 Gb/s optical signal.

Figure 16:
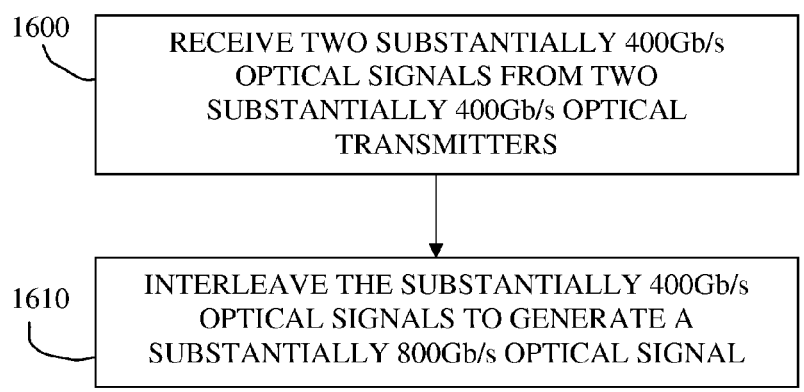
FIG. 16 is a simplified flowchart illustration of a method of generating a substantially 800 Gb/s optical signal for transmission, in accordance with an embodiment of the present invention.

Reference is now made to FIG. 16, which is a simplified flowchart illustration of a method of generating a substantially 800 Gb/s optical signal for transmission, in accordance with an embodiment of the present invention.

Two substantially 400 Gb/s optical signals are received from two substantially 400 Gb/s optical transmitters (step 1600). Each of the received substantially 400 Gb/s optical signals is in a wavelength division multiplexed form over wavelengths which are usable for interleaving. The substantially 400 Gb/s optical signals are interleaved to generate a substantially 800 Gb/s optical signal (step 1610).

Figure 17:
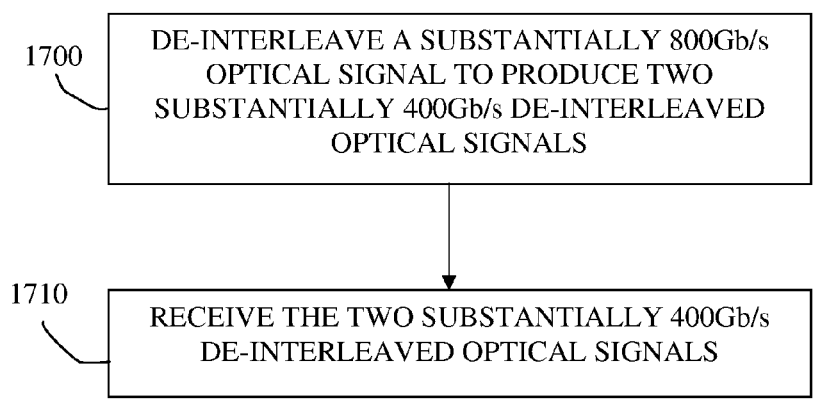
FIG. 17 is a simplified flowchart illustration of a method of receiving a substantially 800 Gb/s optical signal in accordance with an embodiment of the present invention.

Reference is now made to FIG. 17, which is a simplified flowchart illustration of a method of receiving a substantially 800 Gb/s optical signal in accordance with an embodiment of the present invention.

A substantially 800 Gb/s optical signal is de-interleaved to produce two substantially 400 Gb/s de-interleaved optical signals (step 1700), and the two substantially 400 Gb/s de-interleaved optical signals are received (step 1710).

Figure 18:
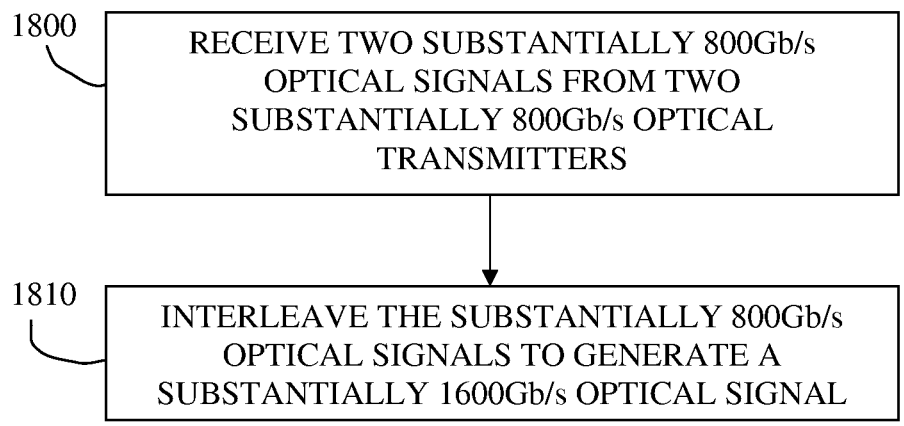
FIG. 18 is a simplified flowchart illustration of a method of generating a substantially 1600 Gb/s optical signal for transmission, in accordance with an embodiment of the present invention.

Reference is now made to FIG. 18, which is a simplified flowchart illustration of a method of generating a substantially 1600 Gb/s optical signal for transmission, in accordance with an embodiment of the present invention.

Two substantially 800 Gb/s optical signals are received from two substantially 800 Gb/s optical transmitters (step 1800). Each of the received substantially 800 Gb/s optical signals is in a wavelength division multiplexed form over wavelengths which are usable for interleaving. The substantially 800 Gb/s optical signals are interleaved to generate a substantially 1600 Gb/s optical signal (step 1810).

Figure 19:
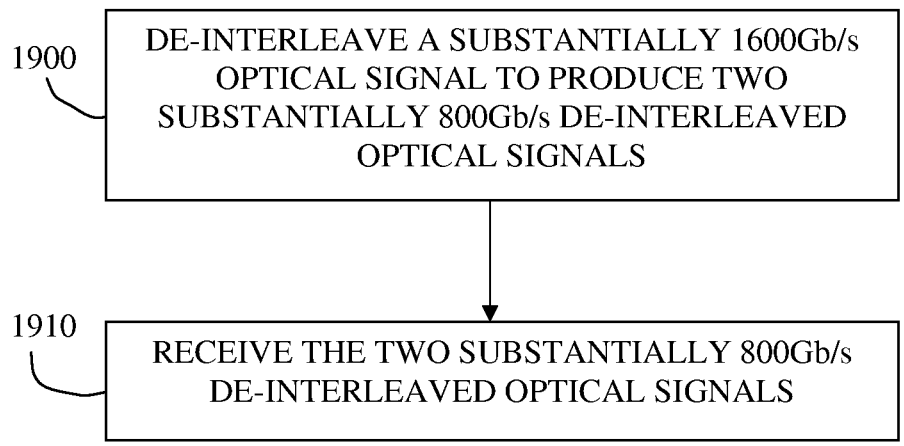
FIG. 19 is a simplified flowchart illustration of a method of receiving a substantially 1600 Gb/s optical signal in accordance with an embodiment of the present invention.

Reference is now made to FIG. 19, which is a simplified flowchart illustration of a method of receiving a substantially 1600 Gb/s optical signal in accordance with an embodiment of the present invention.

A substantially 1600 Gb/s optical signal is de-interleaved to produce two substantially 800 Gb/s de-interleaved optical signals (step 1900), and the two substantially 800 Gb/s de-interleaved optical signals are received (step 1910).

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited by what has been particularly shown and described hereinabove. Rather the scope of the invention is defined by the appended claims and equivalents thereof.

What is claimed is:

1. A substantially 400 Gb/s optical transceiver, comprising:
a substantially 400 Gb/s optical transmitter comprising:
a set of four substantially 100 Gb/s tunable optical transmitters, each of the four substantially 100 Gb/s tunable optical transmitters transmitting a substantially 100 Gb/s optical signal in a wavelength division multiplexed form over four channel wavelengths selected such that the resulting 16 channel wavelengths are different from each other and are suitable for wavelength division multiplexing (WDM), wherein the 16 different channel wavelengths comprise channel wavelengths having the four approximate center wavelengths specified in 100 Gigabit Ethernet (100 GbE) physical layer (PHY) specifications, and 12 other channel wavelengths in International Telecommunication Union (ITU) specified O-band; and an optical transmission interface (OTRIN) comprising:
 a set of four 1:4 wavelength division demultiplexers which are operative to demultiplex the substantially 100 Gb/s optical signals to produce substantially 25 Gb/s optical signals over each of the 16 different channel wavelengths; and
 a 16:1 wavelength division multiplexer which is operative to multiplex the substantially 25 Gb/s optical signals of the 16 different channel wavelengths to generate a substantially 400 Gb/s optical signal for transmission.

2. The substantially 400 Gb/s optical transceiver of claim 1, further comprising:

a substantially 400 Gb/s optical receiver comprising:
 an optical receiving interface (ORCVIN) comprising:
  a 1:16 wavelength division demultiplexer which is operative to demultiplex a received substantially 400 Gb/s optical signal to produce substantially 25 Gb/s optical signals over 16 different channel wavelengths; and
  a set of four 4:1 wavelength division multiplexers, each of the four 4:1 wavelength division multiplexers being operative to multiplex substantially 25 Gb/s optical signals of four different channel wavelengths of the 16 different channel wavelengths using WDM to generate a substantially 100 Gb/s optical signal; and
  a set of four substantially 100 Gb/s colorless or tunable (C/T) optical receivers which are operative to receive the resulting four substantially 100 Gb/s optical signals.

3. A method of generating a substantially 400 Gb/s optical signal for transmission, the method comprising:

receiving four substantially 100 Gb/s optical signals from four substantially 100 Gb/s tunable optical transmitters, each substantially 100 Gb/s tunable optical transmitter transmitting a respective one of the substantially 100 Gb/s optical signals in a wavelength division multiplexed form over four channel wavelengths selected such that the resulting 16 channel wavelengths are different from each other and are suitable for wavelength division multiplexing (WDM), wherein the 16 different channel wavelengths comprise channel wavelengths having the four approximate center wavelengths specified in 100 Gigabit Ethernet (100 GbE) physical layer (PHY) specifications, and 12 other channel wavelengths in International Telecommunication Union (ITU) specified O-band;

demultiplexing the received substantially 100 Gb/s optical signals to produce substantially 25 Gb/s optical signals over each of the 16 different channel wavelengths; and multiplexing the substantially 25 Gb/s optical signals of the 16 different channel wavelengths to generate a substantially 400 Gb/s optical signal.

4. A method of receiving a substantially 400 Gb/s optical signal, the method comprising:

demultiplexing the substantially 400 Gb/s optical signal to produce substantially 25 Gb/s optical signals over 16 different channel wavelengths that comprise channel wavelengths having the four approximate center wavelengths specified in 100 Gigabit Ethernet (100 GbE) physical layer (PHY) specifications, and 12 other channel wavelengths in International Telecommunication Union (ITU) specified O-band;

multiplexing the substantially 25 Gb/s optical signals of the 16 different channel wavelengths as four groups of substantially 25 Gb/s optical signals of 4 different channel wavelengths using wavelength division multiplexing (WDM) to produce four substantially 100 Gb/s optical signals; and receiving the resulting four substantially 100 Gb/s optical signals.

5. A substantially 1 Tb/s optical transceiver, comprising:

a substantially 1 Tb/s optical transmitter comprising:
 a set of ten substantially 100 Gb/s tunable optical transmitters, each of the ten substantially 100 Gb/s tunable optical transmitters transmitting a substantially 100 Gb/s optical signal in a wavelength division multiplexed form over four channel wavelengths selected such that the resulting 40 channel wavelengths are different from each other and are suitable for wavelength division multiplexing (WDM), wherein the 40 different channel wavelengths comprise channel wavelengths having the four approximate center wavelengths specified in 100 Gigabit Ethernet (100 GbE) physical layer (PHY) specifications, and 36 other channel wavelengths in International Telecommunication Union (ITU) specified O-band; and
 an optical transmission interface (OTRIN) comprising:
  a set of ten 1:4 wavelength division demultiplexers which are operative to demultiplex the substantially 100 Gb/s optical signals to produce substantially 25 Gb/s optical signals over each of the 40 different channel wavelengths; and
  a 40:1 wavelength division multiplexer which is operative to multiplex the substantially 25 Gb/s optical signals of the 40 different channel wavelengths to generate a substantially 1 Tb/s optical signal for transmission.

6. The substantially 1 Tb/s optical transceiver of claim 5, further comprising:

a substantially 1 Tb/s optical receiver comprising:
 an optical receiving interface (ORCVIN) comprising:
  a 1:40 wavelength division demultiplexer which is operative to demultiplex a received substantially 1 Tb/s optical signal to produce substantially 25 Gb/s optical signals over 40 different channel wavelengths; and
  a set of ten 4:1 wavelength division multiplexers, each of the ten 4:1 wavelength division multiplexers being operative to multiplex substantially 25 Gb/s optical signals of four different channel wavelengths of the 40 different channel wavelengths using WDM to generate a substantially 100 Gb/s optical signal; and
  a set of ten substantially 100 Gb/s colorless or tunable (C/T) optical receivers which are operative to receive the resulting ten substantially 100 Gb/s optical signals.

7. A method of generating a substantially 1 Tb/s optical signal for transmission, the method comprising:

receiving ten substantially 100 Gb/s optical signals from ten substantially 100 Gb/s tunable optical transmitters, each substantially 100 Gb/s tunable optical transmitter transmitting a respective one of the substantially 100 Gb/s optical signals in a wavelength division multiplexed form over four channel wavelengths selected such that the resulting 40 channel wavelengths are different from each other and are suitable for wavelength division multiplexing (WDM), wherein the 40 different channel wavelengths comprise channel wavelengths having the four approximate center wavelengths specified in 100 Gigabit Ethernet (100 GbE) physical layer (PHY) specifications, and 36 other channel wavelengths in International Telecommunication Union (ITU) specified O-band;

demultiplexing the received substantially 100 Gb/s optical signals to produce substantially 25 Gb/s optical signals over each of the 40 different channel wavelengths; and multiplexing the substantially 25 Gb/s optical signals of the 40 different channel wavelengths to generate a substantially 1 Tb/s optical signal.

8. A method of receiving a substantially 1 Tb/s optical signal, the method comprising:

demultiplexing the substantially 1 Tb/s optical signal to produce substantially 25 Gb/s optical signals over 40 different channel wavelengths that comprise channel wavelengths having the four approximate center wavelengths specified in 100 Gigabit Ethernet (100 GbE) physical layer (PHY) specifications, and 36 other channel wavelengths in International Telecommunication Union (ITU) specified O-band;

multiplexing the substantially 25 Gb/s optical signals of the 40 different channel wavelengths as ten groups of substantially 25 Gb/s optical signals of 4 different channel wavelengths using wavelength division multiplexing (WDM) to produce ten substantially 100 Gb/s optical signals; and receiving the resulting ten substantially 100 Gb/s optical signals.

9. A method of operating a substantially 100 Gb/s tunable optical transceiver, the method comprising:

operating the substantially 100 Gb/s tunable optical transceiver in a first mode at center wavelengths as defined for 100 Gigabit Ethernet (100 GbE) for stand-alone communication at substantially 100 Gb/s;

operating the substantially 100 Gb/s tunable optical transceiver in a second mode at wavelengths which are different from wavelengths used by at least one additional substantially 100 Gb/s optical transceiver and which are suitable for wavelength division multiplexing (WDM) therewith for communication together with the at least one additional substantially 100 Gb/s optical transceiver in a wavelength division multiplexed form at a bit rate greater than or equal to substantially 200 Gb/s; and determining one of the first mode and the second mode prior to the operating, the determining comprising determining the one of the first mode and the second mode automatically in response to at least one of the following: an instruction of a network operator; and a selection by the network operator.

10. A substantially 100 Gb/s tunable optical transceiver, comprising:

a substantially 100 Gb/s tunable optical transmitter comprising:
a transmitter electrical interface (TREI); and
a transmitter electro-optical interface (TREO) operatively associated with the TREI and comprising four tunable laser sources (TLs) and a 4:1 colorless wavelength division multiplexer;

a substantially 100 Gb/s colorless or tunable optical receiver comprising:
a receiver electrical interface (RXEI); and
a receiver electro-optical interface (RXEO) operatively associated with the RXEI and comprising a 1:4 colorless or tunable wavelength division demultiplexer; and a micro-controller operative to control the TREO for tuning the four TLs and to control the RXEO when the demultiplexer is a 1:4 tunable wavelength division demultiplexer for tuning the demultiplexer so as to enable operation of the substantially 100 Gb/s tunable optical transceiver in a first mode at center wavelengths as defined for 100 Gigabit Ethernet (100 GbE) for stand-alone communication at substantially 100 Gb/s and in a second mode at wavelengths which are different from wavelengths used by at least one additional substantially 100 Gb/s optical transceiver and which are suitable for wavelength division multiplexing (WDM) therewith for communication together with the at least one additional substantially 100 Gb/s optical transceiver in a wavelength division multiplexed form at a bit rate greater than or equal to substantially 200 Gb/s, wherein the micro-controller is operative to control the TREO for tuning the four TLs and to control the RXEO when the demultiplexer is a 1:4 tunable wavelength division demultiplexer for tuning the demultiplexer in response to a determination of one of the first mode and the second mode, the determination being made prior to operation in the one of the first mode and the second mode and comprising a determination made automatically in response to at least one of the following: an instruction of a network operator; and a selection by the network operator.

11. A method of operating a substantially 100 Gb/s tunable optical transceiver, the method comprising:

operating the substantially 100 Gb/s tunable optical transceiver in a first mode at center wavelengths as defined for 100 Gigabit Ethernet (100 GbE) for stand-alone communication at substantially 100 Gb/s;

operating the substantially 100 Gb/s tunable optical transceiver in a second mode at wavelengths which are different from wavelengths used by at least one additional substantially 100 Gb/s optical transceiver and which are suitable for wavelength division multiplexing (WDM) therewith for communication together with the at least one additional substantially 100 Gb/s optical transceiver in a wavelength division multiplexed form at a bit rate greater than or equal to substantially 200 Gb/s;

determining one of the first mode and the second mode prior to the operating; and transmitting an indication identifying the determined one of the first mode and the second mode.

\* \* \* \* \*

UNITED STATES PATENT AND TRADEMARK OFFICE
CERTIFICATE OF CORRECTION

PATENT NO. : 8,873,963 B2  
APPLICATION NO. : 13/558166  
DATED : October 28, 2014  
INVENTOR(S) : Doron Handelman Page 1 of 1

It is certified that error appears in the above-identified patent and that said Letters Patent is hereby corrected as shown below:

In the Specification

In Col. 10, line 57, change "(Xs)" to --($\lambda$s)--

In Col. 18, line 48, change "receiving" to --10 receiving--

In Col. 25, line 45, change "200Gb/s" to --$\geq$200Gb/s--

In Col. 26, line 21, change "200Gb/s" to --$\geq$200Gb/s--

In Col. 26, line 26, change "200 Gb/s" to --$\geq$200Gb/s--

In Col. 33, line 46, change "200 Gb/s" to --$\geq$200Gb/s--

Signed and Sealed this  
Fifteenth Day of December, 2015

Michelle K. Lee  
*Director of the United States Patent and Trademark Office*